United States Patent
Saigo et al.

(10) Patent No.: US 7,130,009 B2
(45) Date of Patent: Oct. 31, 2006

(54) LIQUID CRYSTAL DISPLAY WITH SUPERPOSED CONTACT HOLES AND METHOD OF MANUFACTURING THE SAME

(75) Inventors: Shingo Saigo, Izumi (JP); Takasuke Hayase, Izumi (JP); Makoto Horinouchi, Izumi (JP); Hideto Motoshima, Izumi (JP); Akitoshi Maeda, Izumi (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 112 days.

(21) Appl. No.: 10/661,543

(22) Filed: Sep. 15, 2003

(65) Prior Publication Data

US 2004/0070718 A1    Apr. 15, 2004

(30) Foreign Application Priority Data

Sep. 13, 2002    (JP) .............................. 2002-268952

(51) Int. Cl.
G02F 1/1343    (2006.01)

(52) U.S. Cl. ...................................... 349/141; 349/138
(58) Field of Classification Search ................ 349/141, 349/42
See application file for complete search history.

(56) References Cited

U.S. PATENT DOCUMENTS

| | | | |
|---|---|---|---|
| 6,642,979 B1 * | 11/2003 | Choo et al. .................. | 349/113 |
| 6,683,668 B1 * | 1/2004 | Moon et al. .................. | 349/138 |
| 6,958,799 B1 * | 10/2005 | Tomioka et al. ............. | 349/141 |
| 2001/0006408 A1 * | 7/2001 | Matsuyama et al. ........ | 349/143 |

FOREIGN PATENT DOCUMENTS

WO    WO 98/47044    10/1998

* cited by examiner

*Primary Examiner*—Andrew Schechter
*Assistant Examiner*—Richard Kim
(74) *Attorney, Agent, or Firm*—Young & Thompson

(57) ABSTRACT

A display portion is divided by scan lines and signal lines into sections where pixels are provided. Contact holes each for connecting common wiring and a common electrode together are not formed for all the pixels, but decimated so as to be arranged in zigzags.

1 Claim, 26 Drawing Sheets

_US 7,130,009 B2_

LIQUID CRYSTAL DISPLAY WITH SUPERPOSED CONTACT HOLES AND METHOD OF MANUFACTURING THE SAME

This application claims priority to prior application JP 2002-268952, the disclosure of which is incorporated herein by reference.

BACKGROUND OF THE INVENTION

The present invention relates to a liquid crystal display and a method of manufacturing the same and, in particular, relates to an in-plane switching (IPS) liquid crystal display in which signal lines are partially covered with a common electrode via an interlayer insulating film.

Conventionally, use has been widely made of transmission type liquid crystal displays employing thin film transistors (TFTs) or metal-insulator-metal (MIM) devices as switching elements for driving and controlling pixel electrodes. Particularly, IPS liquid crystal displays have been used as monitors, which can realize wide viewing angles like cathode ray tubes (CRTs).

FIGS. 1 to 3 show structures of a one-pixel portion of an active matrix substrate in a conventional IPS liquid crystal display using TFTs disclosed in WO98/47044 (pp. 8–18, FIGS. 1, 3 and 4, it will be hereinafter referred to as a conventional reference). Herein, FIG. 1 is a plan view, FIG. 2 is a sectional view taken along line X–X' in FIG. 1, and FIG. 3 is a sectional view taken along line Y–Y' in FIG. 1. In the active matrix substrate of the IPS liquid crystal display, a plurality of pixel electrodes and a common electrode are formed so as to face each other like alternate teeth of opposed combs, and electric fields substantially parallel to the substrate are generated between the electrodes to thereby control orientation of liquid crystal molecules.

As shown in FIG. 1, in the one-pixel portion of the active matrix substrate, a scan line 111 for supplying a scan signal and a signal line 112 for supplying a display signal cross each other at right angles, and common wiring 113 for applying electric potential to a common electrode 122 is arranged in parallel to the scan line 111. On the other hand, the common electrode 122 and a pixel electrode 121 are placed so as to face each other like alternate teeth of opposed combs. In a region defined by crossing between the scan line 111 and the signal line 112, a TFT 114 is provided so as to be connected to the scan line 111, the signal line 112, and the pixel electrode 121.

A gate electrode 123 of the TFT 114 is provided as a part of the scan line 111, a drain electrode 125 is connected to the signal line 112, a source electrode 124 is connected to the pixel electrode 121 via a contact hole 126, and the common wiring 113 is connected to the common electrode 122 via a contact hole 127. Further, the signal line 112 is disposed so as to be partially covered with the common electrode 122.

As shown in FIG. 2, the gate electrode 123, a gate insulating film 131, and an insular semiconductor layer 134 are provided on a transparent insulating substrate 120. Further, the source electrode 124 and the drain electrode 125 are separately provided and cover the semiconductor layer 134 (an amorphous silicon (a-Si) layer 164 and an n+ type amorphous silicon (n+ type a-Si) layer 174), thereby forming the TFT 114. In addition, an interlayer insulating film (a protective film 132 and an organic insulating film 133) is provided so as to cover the TFT 114. Further, as shown in FIG. 3, the pixel electrode 121 is connected to the source electrode 124 via the contact hole 126 formed in the organic insulating film 133 while the common electrode 122 is connected to the common wiring 113 via the contact hole 127 formed in the organic insulating film 133 and the gate insulating film 131.

Now, description will be made of a method of the manufacturing the active matrix substrate having the foregoing structure. First, a metal film made of a Cr—Mo alloy is deposited on the transparent insulating substrate 120 made of glass or the like, then patterning is carried out so as to form the gate electrodes 123, the scan lines 111, and the common wiring 113. Subsequently, after the gate insulating film 131, the a-Si layer 164, and the n+ type a-Si layer 174 are sequentially formed, patterning is performed so as to form the semiconductor layers 134. Thereafter, a metal film made of a Cr—Mo alloy is deposited, and the source electrodes 124, the drain electrodes 125 and the signal lines 112 are formed by patterning. Then, using them as masks, the n+ type a-Si layers 174 are removed by etching to thereby form channels.

Subsequently, the protective film 132 made of silicon nitride is deposited and patterned. Then, the photosensitive organic insulating film 133 is applied and patterned, then using it as a mask, the gate insulating film 131 is patterned to form the contact holes 126 and 127. Thereafter, a transparent conductive film made of indium tin oxide (ITO) is deposited so as to cover the organic insulating film 133, and the common electrode 122 and the pixel electrodes 121 are formed by patterning. In this manner, the connection between the common electrode 122 and the common wiring 113 and the connection between the pixel electrodes 121 and the source electrodes 124 are established.

As described above, the organic insulating film 133 having a low dielectric constant is used as a part of the interlayer insulating film. This is because capacitive coupling between the signal line 112 and the common electrode 122 is reduced and crosstalk is suppressed when the common electrode and the signal line are partially overlapped with each other in order to improve the aperture ratio. Further, the flatness of the active matrix substrate is improved to reduce fluctuation of gaps relative to an opposing substrate, thereby improving uniformity of luminance.

When the organic insulating film is not used in the interlayer insulating film, the protective layer 132 made of silicon nitride is alternatively formed thicker. In this case, the contact holes 126 and 127 are formed through one photolithography process.

In the foregoing IPS liquid crystal display in which the signal lines are partially covered with the common electrode via the interlayer insulating film, however, when pinholes are generated in the interlayer insulating film, the signal lines and the common electrode tend to be short-circuited together to cause a longitudinal line defect. This causes a problem in terms of manufacturing yield According to experiments by the present inventors, it has been confirmed that, in the patterning process of the signal lines 112, patterning failure of the metal film for the signal lines 112 occurs in regions from the signal lines 112 to the contact holes 127 due to foreign matter such as a photoresist so that the signal lines 112 and the common electrode 112 are short-circuited together via the contact holes 127. It has been found that this phenomenon becomes remarkable particularly in high resolution panels with narrow pixel pitches.

Further, when the interlayer insulating film is formed only by the inorganic film such as the silicon nitride film, i.e. without using the organic insulating film, it has been confirmed that if the contact holes 126 and 127 are formed by the use of at least dry etching, plasma is concentrated on foreign matter or defect portions of a photoresist, so that the interlayer insulating film is resultantly etched to have pinholes, and the signal lines 112 and the common electrode 122 are short-circuited together via the pinholes.

SUMMARY OF THE INVENTION

It is an object of the present invention to provide an IPS liquid crystal display in which signal lines are partially covered with a common electrode via an interlayer insulating film, which can reduce possibility of occurrence of a longitudinal line defect caused by a short circuit between the signal line and the common electrode to thereby improve the manufacturing yield, and further provide a manufacturing method of such a liquid crystal display.

According to the present invention, there is provided an in-plane switching liquid crystal display having thin film transistors on a substrate, scan lines and signal lines connected to the thin film transistors and longitudinally and latitudinally crossing each other, and common wiring formed by the same layer as the scan lines, and generating electric fields substantially parallel to the substrate between a common electrode connected to the common wiring and covering the signal lines partially via an interlayer insulating film formed on the thin film transistors, and pixel electrodes connected to the thin film transistors, the liquid crystal display characterized in that with respect to pixels divided and defined by the scan lines and the signal lines, contact holes for connecting the common wiring and the common electrode to each other are formed at a ratio of one contact hole to a plurality of the pixels.

It may be configured in the foregoing liquid crystal display that when seeing, from one pixel formed with the contact hole, other pixels formed with the contact holes, respectively, and located around the one pixel, the other pixels are arranged at an interval of at least one pixel in longitudinal and latitudinal directions from the one pixel.

Further, according to the present invention, there is provided an in-plane switching liquid crystal display having thin film transistors on a substrate, scan lines and signal lines connected to the thin film transistors and longitudinally and latitudinally crossing each other, and common wiring formed by the same layer as the scan lines, and generating electric fields substantially parallel to the substrate between a common electrode connected to the common wiring and covering the signal lines at least partly via an interlayer insulating film formed on the thin film transistors, and pixel electrodes connected to the thin film transistors, the liquid crystal display characterized in that the interlayer insulating film comprises two or more layers of inorganic insulating films, and contact holes connecting the common wiring and the common electrode to each other and contact holes connecting the thin film transistors and the pixel electrodes to each other are each formed by superposition of corresponding contact holes formed in the two or more inorganic insulating films.

Further, according to the present invention, there is provided a method of manufacturing an in-plane switching liquid crystal display having thin film transistors on a substrate, scan lines and signal lines connected to the thin film transistors and longitudinally and latitudinally crossing each other, and common wiring formed by the same layer as the scan lines, and generating electric fields substantially parallel to the substrate between a common electrode connected to the common wiring and covering the signal lines partially via an interlayer insulating film formed on the thin film transistors, and pixel electrodes connected to the thin film transistors, the method comprising the steps of forming a first inorganic insulating film on the thin film transistors, and forming, using at least dry etching, first contact holes for connecting the common wiring and the common electrode to each other, and second contact holes for connecting the thin film transistors and the pixel electrodes to each other; forming a second inorganic insulating film on the first inorganic insulating film, and forming third contact holes so as to be superposed on the first contact holes, and fourth contact holes so as to be superposed on the second contact holes; and forming a conductive film on the second inorganic insulating film, and forming the common electrode connected to the common wiring via the first and third contact holes, and the pixel electrodes connected to the thin film transistors via the second and fourth contact holes.

It may be arranged in the foregoing manufacturing method that the third contact holes are formed inside the first contact holes, and the fourth contact holes are formed inside the second contact holes.

Further, according to the present invention, there is provided a method of manufacturing an in-plane switching liquid crystal display having thin film transistors on a substrate, scan lines and signal lines connected to the thin film transistors and longitudinally and latitudinally crossing each other, and common wiring formed by the same layer as the scan lines, and generating electric fields substantially parallel to the substrate between a common electrode connected to the common wiring and covering the signal lines partially via an interlayer insulating film formed on the thin film transistors, and pixel electrodes connected to the thin film transistors, the method characterized in that the interlayer insulating film is formed by an inorganic insulating film, and a thickness of the inorganic insulating film is set to be greater than at least a thickness of a portion of the insulating film where contact holes for connecting the common wiring and the common electrode to each other are formed by dry etching.

By employing the foregoing structure, in the IPS liquid crystal display in which the signal lines are partially covered with the common electrode via the interlayer insulating film, the probability of occurrence of short-circuiting between the signal lines and the common electrode via the contact holes connecting the common wiring and the common electrode to each other can be lowered to thereby enable improvement in manufacturing yield. Further, since the contact holes are arranged in zigzags, the uniformity of display can be ensured.

Further, when the interlayer insulating film is formed only by the inorganic insulating films, the inorganic insulating films are formed by performing the film forming process twice and the contact hole forming process is also carried out twice. As a consequence, even if pinholes are generated in the inorganic insulating films due to dry etching implemented upon forming the contact holes, the pin holes do not go through the total thickness of the inorganic insulating films. Therefore, the probability of occurrence of short-circuiting between the signal lines and the common electrode can be largely reduced to thereby enable improvement in manufacturing yield. Further, the contact holes formed in the second process are formed inside the contact holes formed in the first process, respectively. Therefore, the contact holes can be formed into excellent sectional shapes without side etching.

Similarly, when the interlayer insulating film is formed only by the inorganic insulating film, a thickness of this inorganic insulating film is set to be greater than at least a thickness of a portion of the insulating film where the contact holes for connecting the common wiring and the common electrode to each other are formed by dry etching. As a consequence, even if pinholes are generated in the inorganic insulating film due to dry etching implemented upon forming the contact holes, the pin holes do not go through the whole thickness of the inorganic insulating film. Therefore, the probability of occurrence of short-circuiting between the signal lines and the common electrode can be largely reduced to thereby enable improvement in manufacturing yield.

DESCRIPTION OF THE PREFERRED EMBODIMENT:

Now, preferred embodiments of the present invention will be described hereinbelow with reference to the accompanying drawings.

(First Embodiment)

Figure 1:
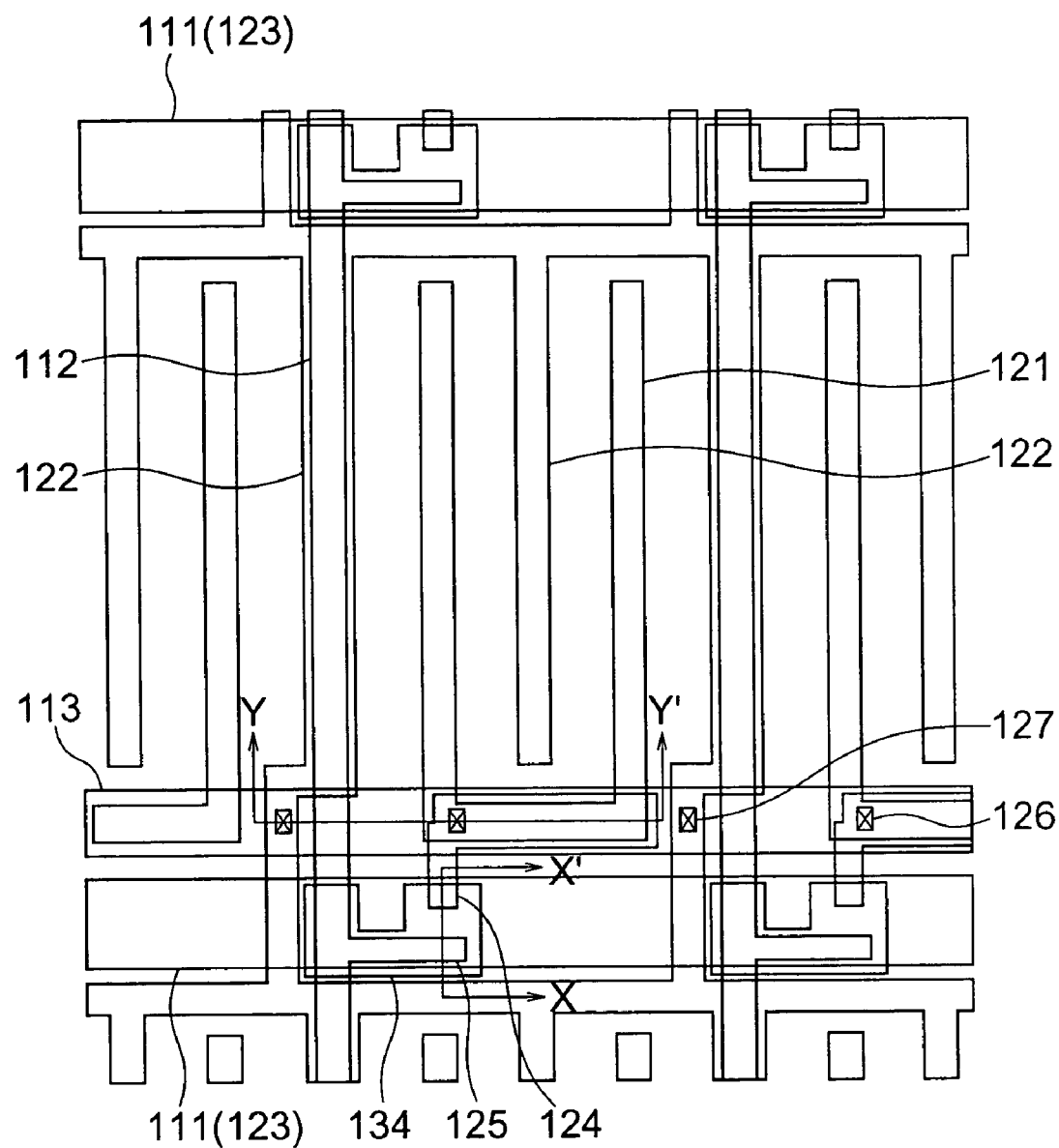
FIG. 1 is an enlarged plan view showing a one-pixel portion of a TFT substrate in a conventional IPS liquid crystal display.
Figure 2:
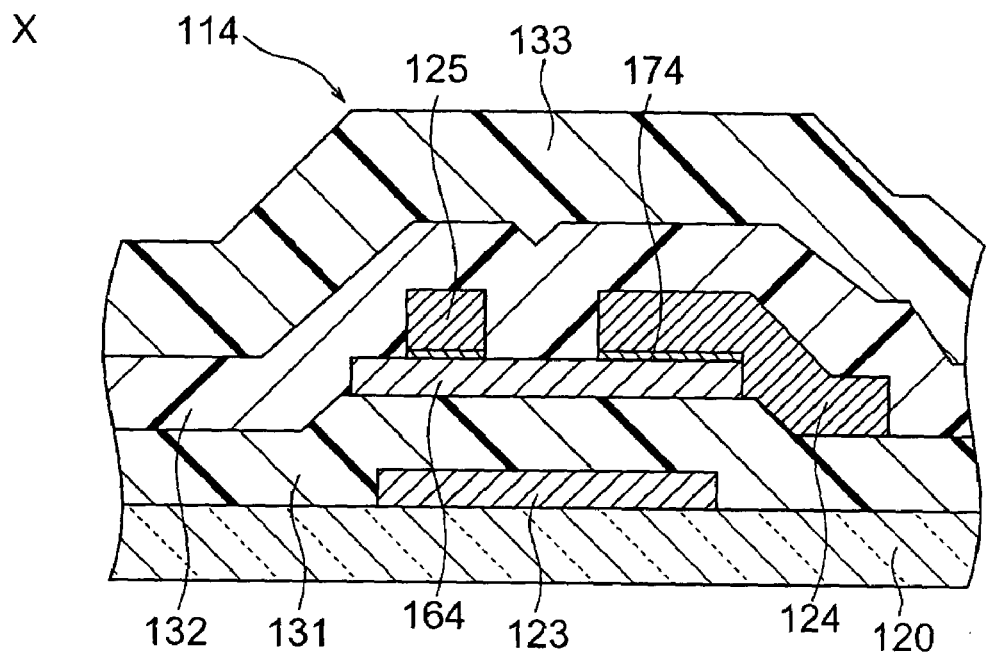
FIG. 2 is a sectional view taken along line X–X' in FIG. 1.
Figure 3:
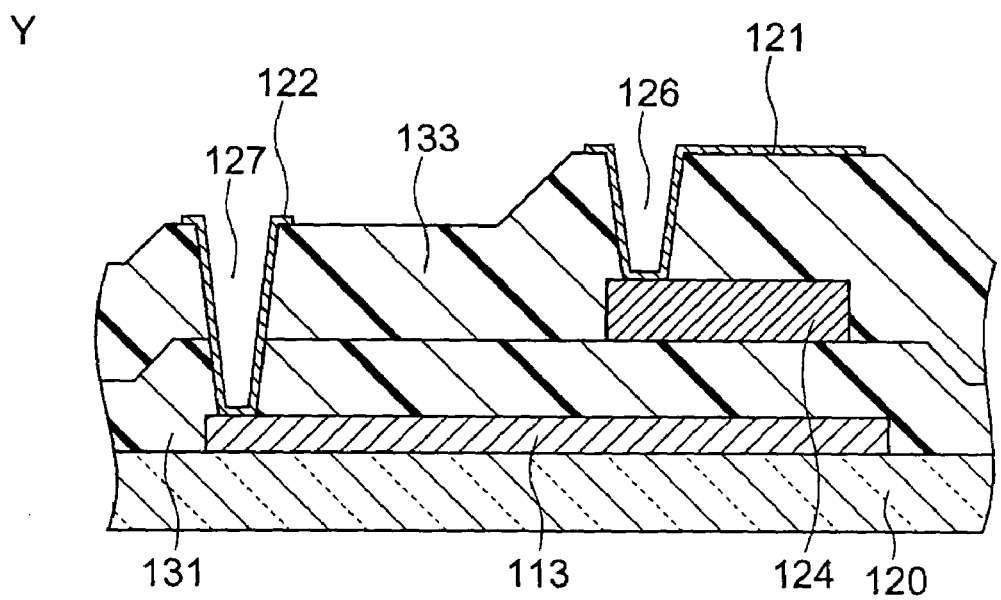
FIG. 3 is a sectional view taken along line Y–Y' in FIG. 1.
Figure 4:
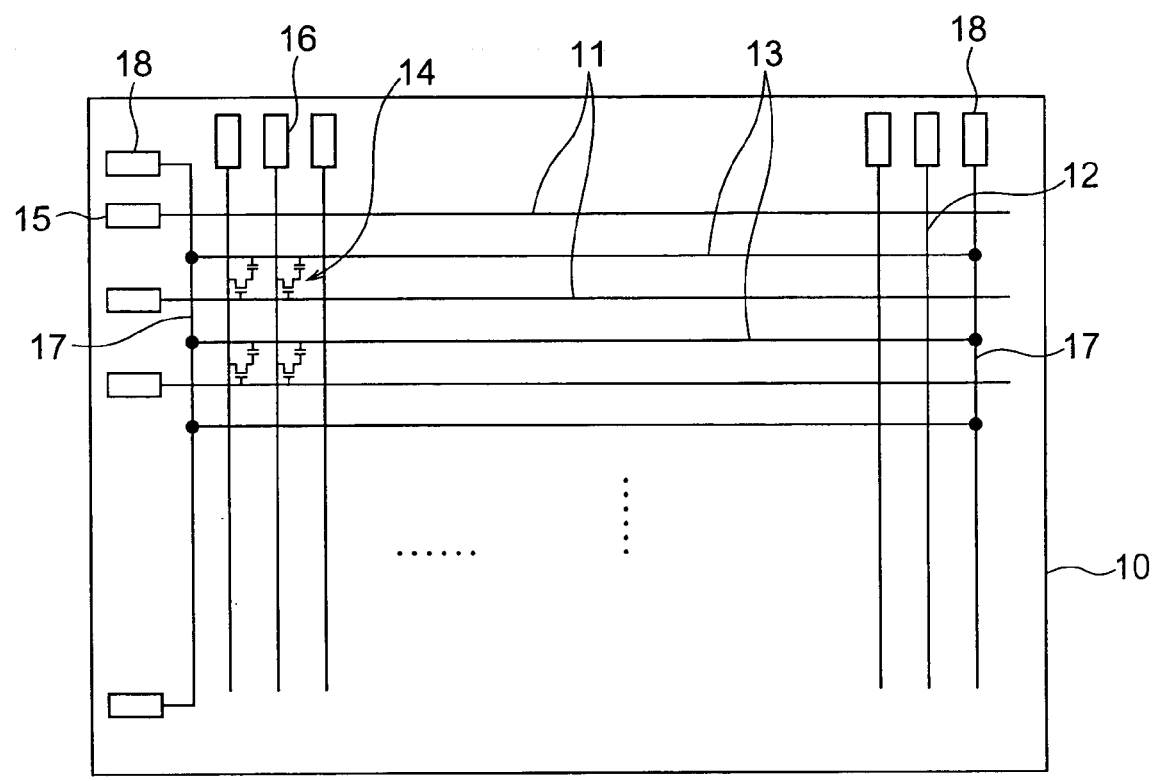
FIG. 4 is a plan view conceptually showing a structure of a TFT substrate in an IPS liquid crystal display according to a first embodiment of the present invention.

As shown in FIG. 4, on a surface of the TFT substrate 10 on its side facing an opposing substrate, scan lines 11 and signal lines 12 are provided so as to cross each other at right angles, and common lines 13 of common wiring are provided between the adjacent scan lines 11 in parallel therewith. In regions defined by crossing between the scan lines 11 and the signal lines 12, TFTs 14 are formed, respectively, so as to be arranged in a matrix. Scan line terminals 15 and signal line terminals 16 are provided at ends of the scan lines 11 and the signal lines 12, respectively, so as to receive drive signals from an external drive circuit.

The common lines 13 are mutually connected to form the common wiring for supplying a referential common potential for AC driving liquid crystals. Specifically, both ends of each common line 13 are connected to a pair of common-line connecting lines 17 which are arranged along short sides of the TFT substrate 10, respectively. Capacitors are formed between the common lines 13 (common wiring) and pixel electrodes connected to source electrodes of the TFTs 14. Common wiring terminals 18 are arranged at ends of the common-line connecting lines 17, respectively.

Figure 5:
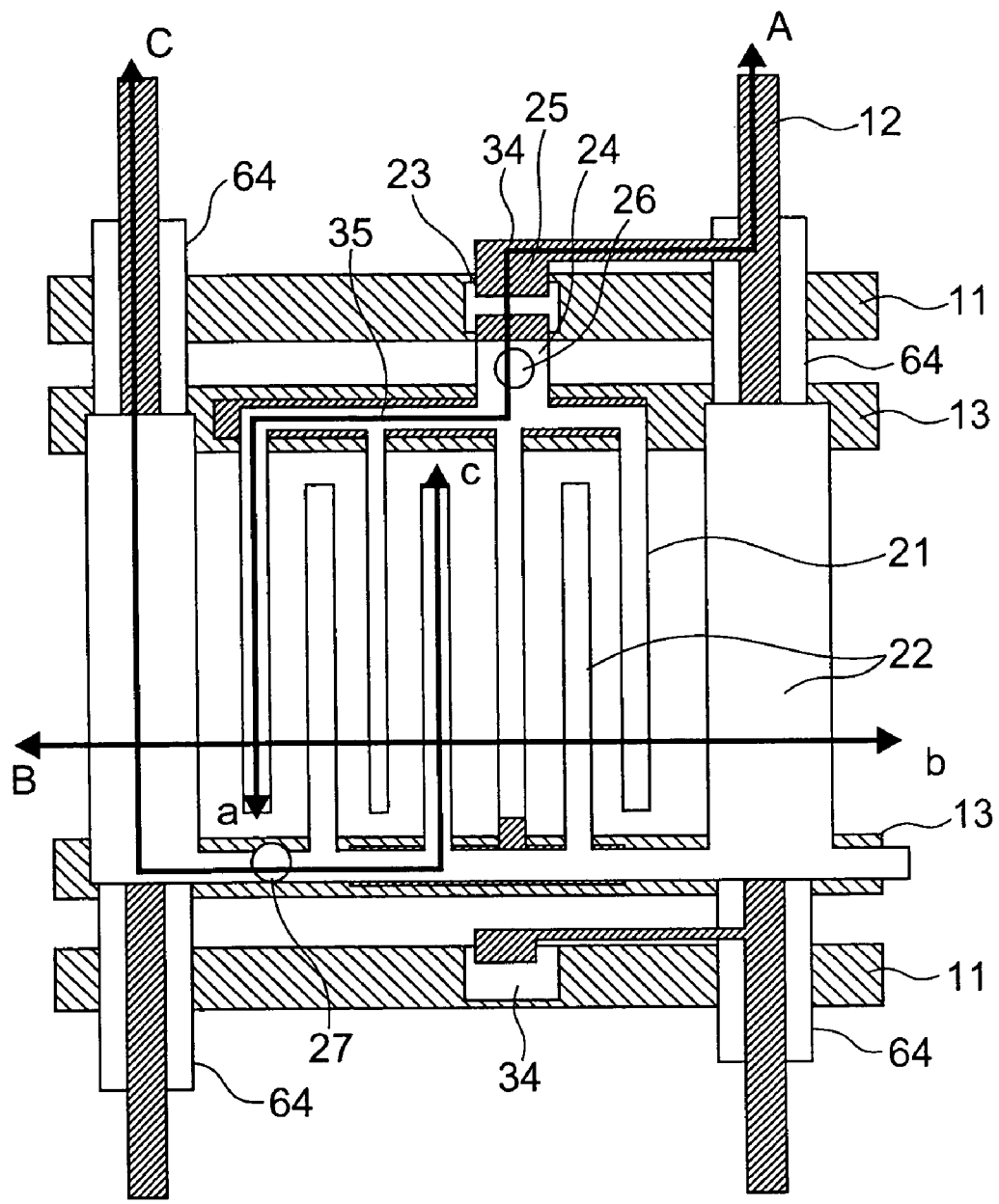
FIG. 5 is an enlarged plan view showing a one-pixel portion of the TFT substrate shown in FIG. 4.
Figure 6A:
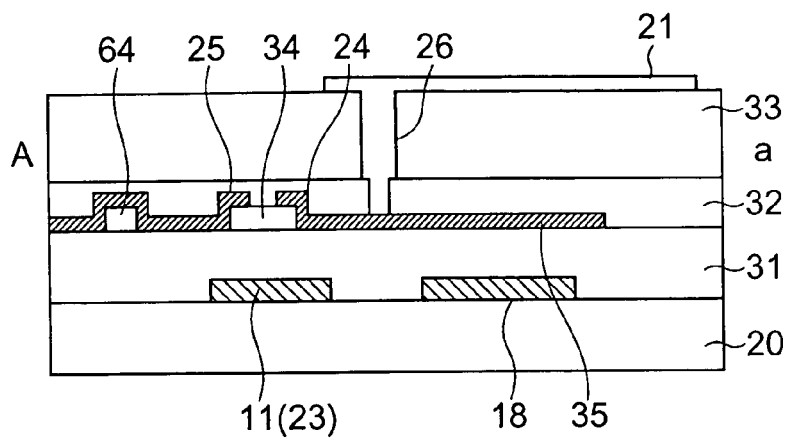
FIGS. 6A, 6B, and 6C are sectional views taken along line A-a, line B-b, and line C-c in FIG. 5, respectively.
Figure 6B:
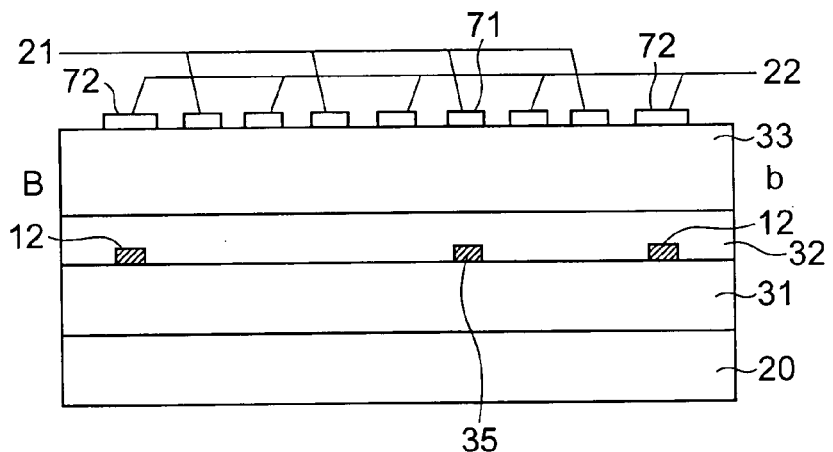
Figure 6C:
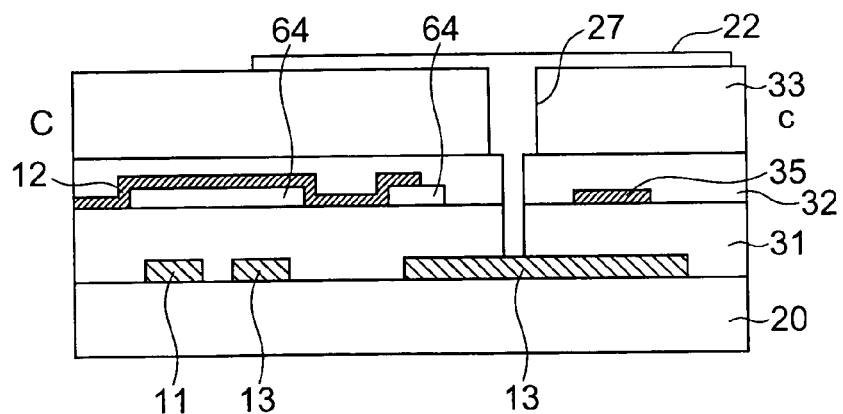

As shown in FIG. 5, in a region defined by crossing between the scan lines 11 and the signal lines 12 formed on the TFT substrate, a pixel electrode 21 and a common electrode 22 each formed like a comb having teeth are arranged alternately, and electric fields substantially parallel to the TFT substrate 10 are generated between the electrodes to thereby control orientation of liquid crystal molecules. As shown in FIGS. 6A to 6C, the pixel electrode 21 and the common electrode 22 are provided on an interlayer insulating film comprising a passivation film 32 and an organic insulating film 33 that are formed on the TFT 14.

The TFT 14 is an inverse stagger thin film transistor in this embodiment. In the TFT 14, a gate electrode 23 of the TFT 14 is formed as a part of the scan line 11, a source electrode 24 is connected to the pixel electrode 21 via a pixel electrode contact hole 26 formed in the interlayer insulating film, the common line 13 is connected to the common electrode 22 via a common electrode contact hole 27 formed in the interlayer insulating film and a gate insulating film 31, and a drain electrode 25 is connected to the signal line 12. The TFT 14 is inputted with a scan signal via the scan line 11 and the gate electrode 23 and with a display signal via the signal line 12 and the drain electrode 25, so that charge is written into the pixel electrode 21. Further, an accumulation capacitor is formed between the common line 13 and an accumulation capacitor electrode 35.

Figure 7:
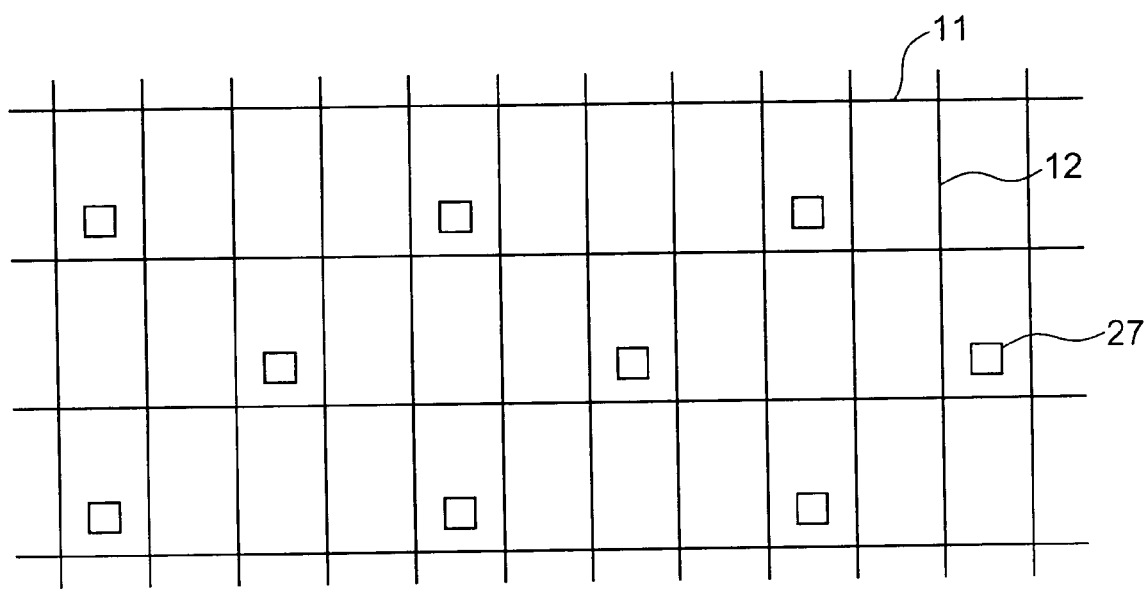
FIG. 7 is an exemplary diagram showing location of common electrode contact holes.
Figure 8:
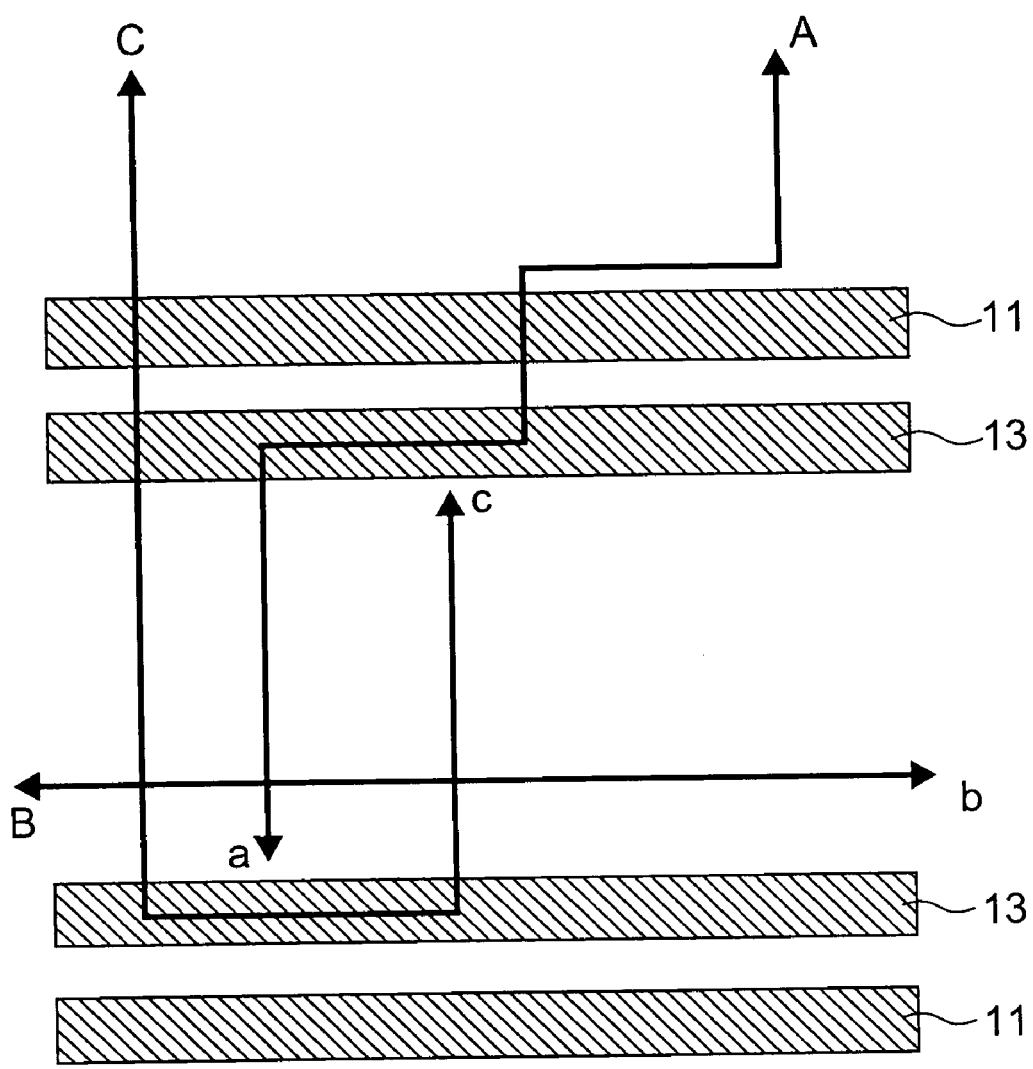
FIG. 8 is a process plan view (first process) of the one-pixel portion for explaining an example of a manufacturing method of a liquid crystal panel using the TFT substrate of FIG. 4.
Figure 9A:
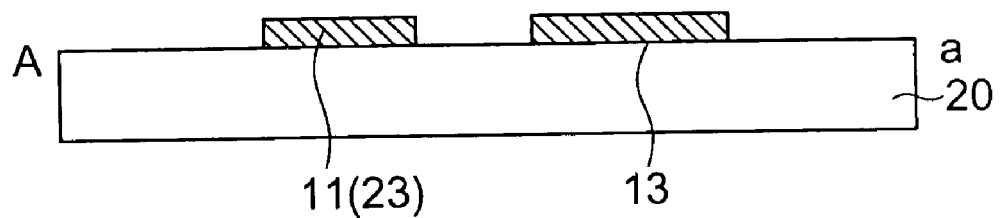
FIGS. 9A, 9B, and 9C are process sectional views taken along line A-a, line B-b, and line C-c in FIG. 8, respectively.
Figure 9B:
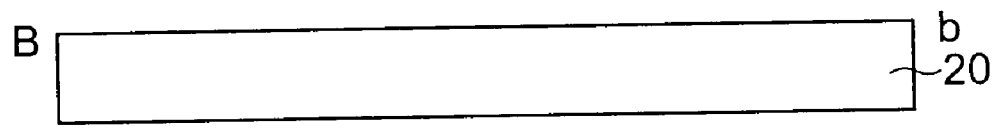
Figure 9C:
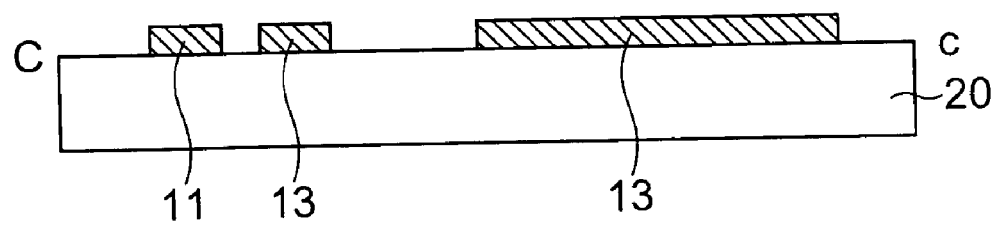
Figure 10:
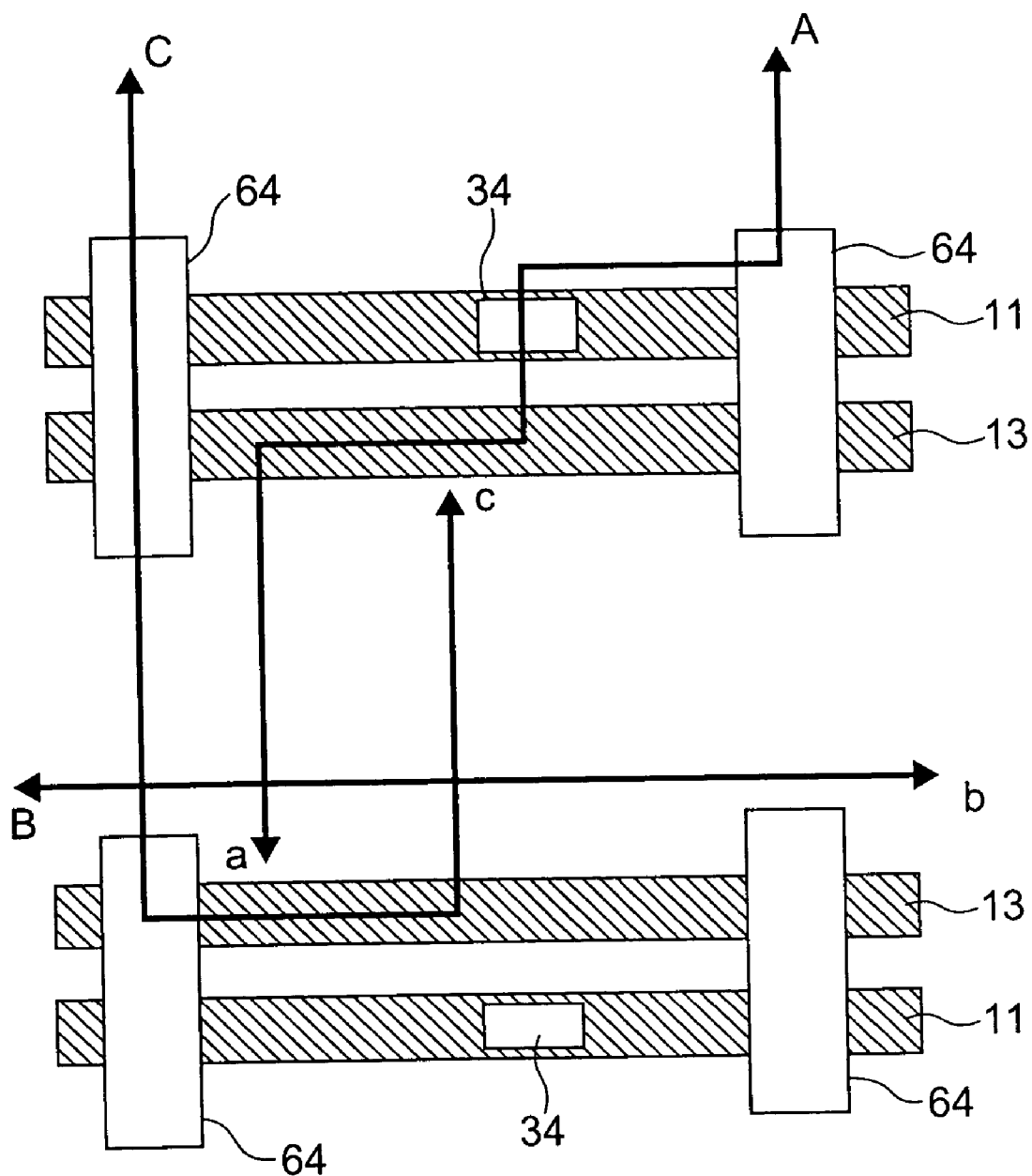
FIG. 10 is a process plan view (second process) of the one-pixel portion for explaining the example of the manufacturing method of the liquid crystal panel using the TFT substrate of FIG. 4.
Figure 11A:
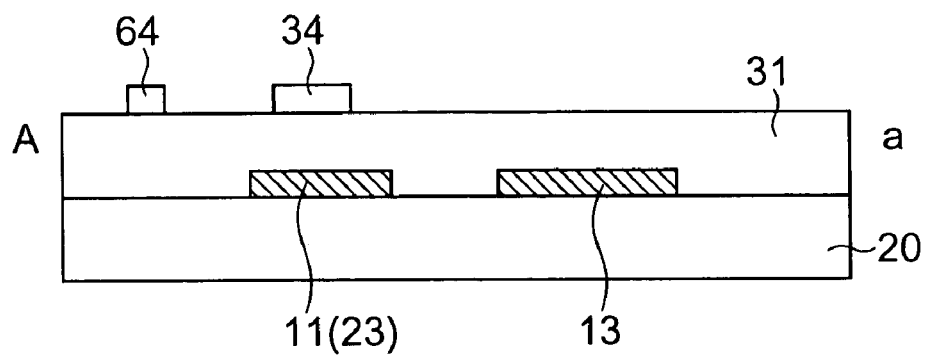
FIGS. 11A, 11B, and 11C are process sectional views taken along line A-a, line B-b, and line C-c in FIG. 10, respectively.
Figure 11B:
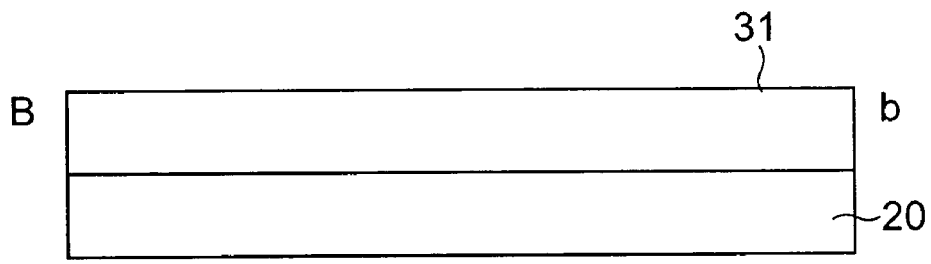
Figure 11C:
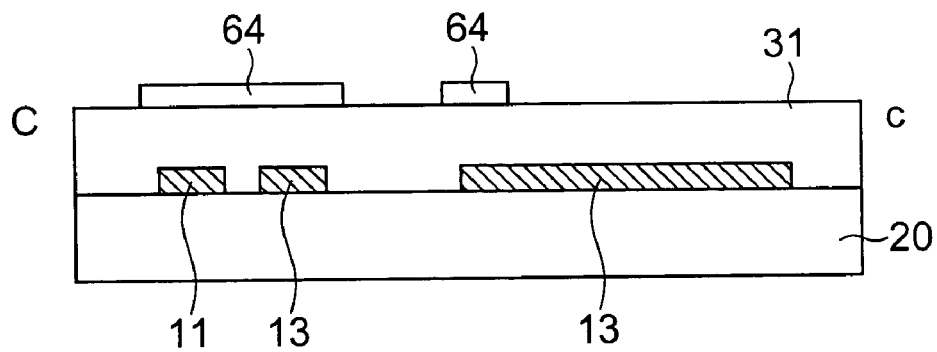
Figure 12:
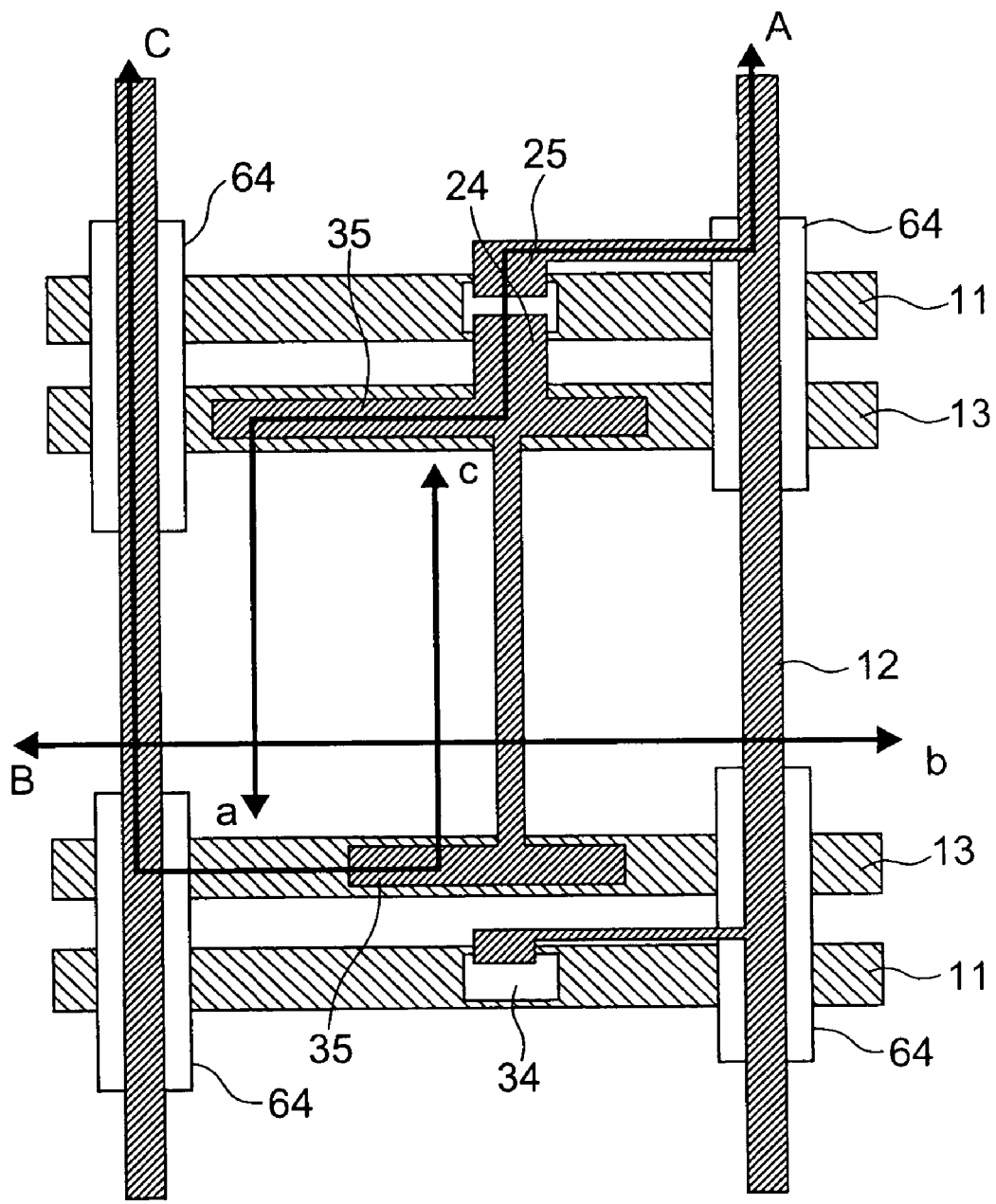
FIG. 12 is a process plan view (third process) of the one-pixel portion for explaining the example of the manufacturing method of the liquid crystal panel using the TFT substrate of FIG. 4.
Figure 13A:
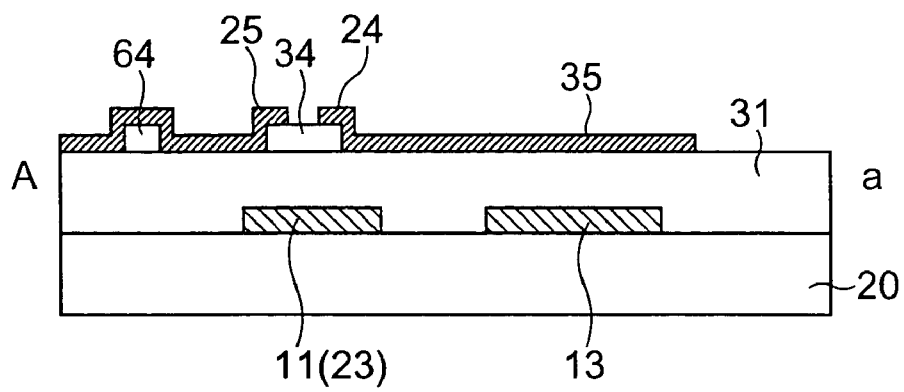
FIGS. 13A, 13B, and 13C are process sectional views taken along line A-a, line B-b, and line C-c in FIG. 12, respectively.
Figure 13B:
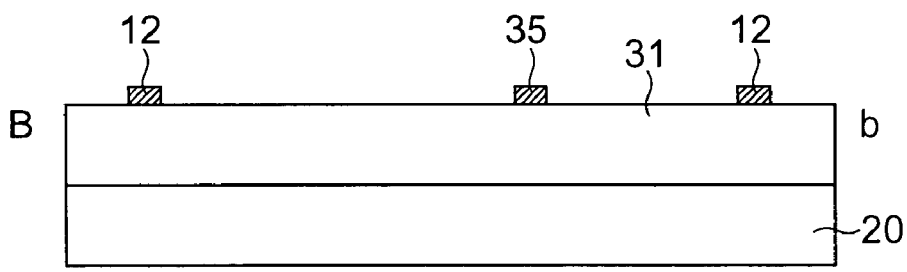
Figure 13C:
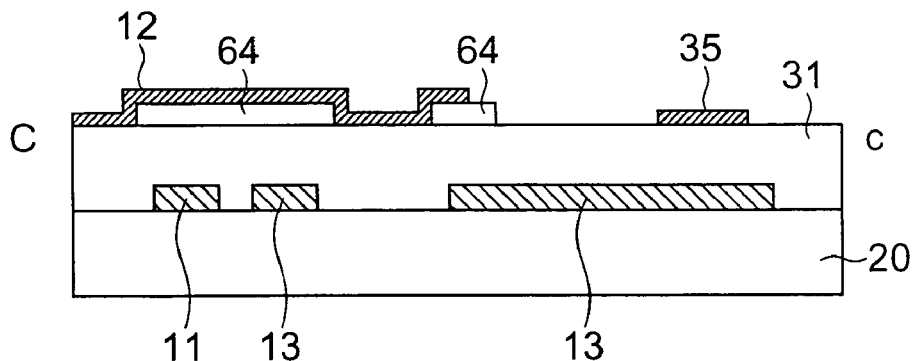
Figure 14:
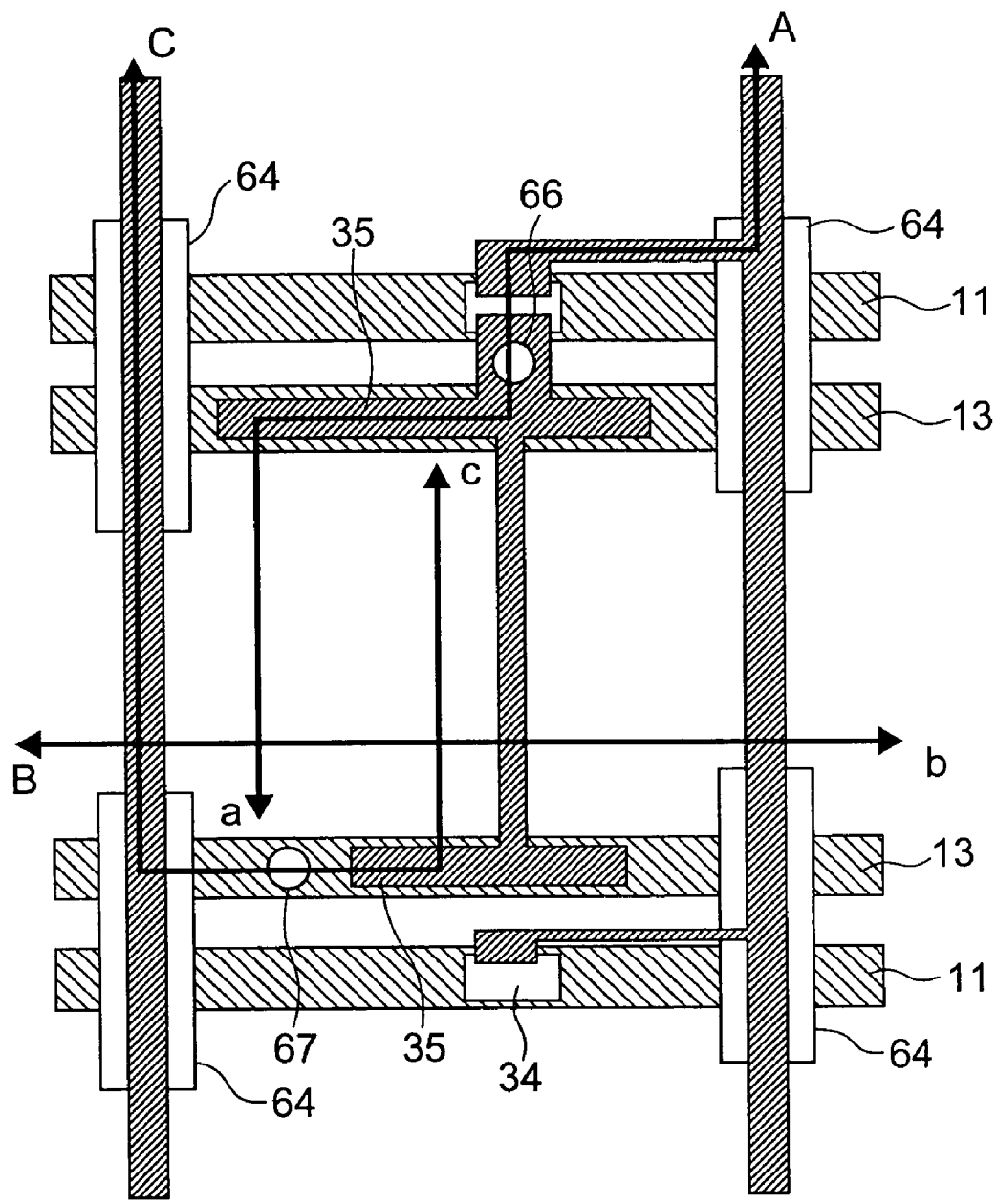
FIG. 14 is a process plan view (fourth process) of the one-pixel portion for explaining the example of the manufacturing method of the liquid crystal panel using the TFT substrate of FIG. 4.
Figure 15A:
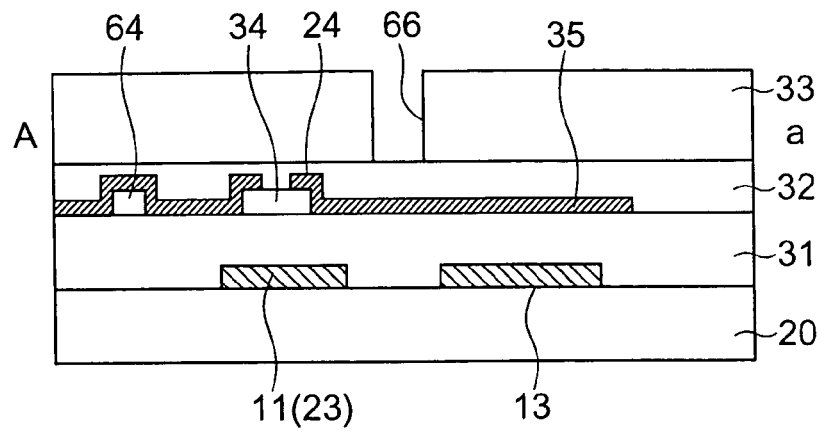
FIGS. 15A, 15B, and 15C are process sectional views taken along line A-a, line B-b, and line C-c in FIG. 14, respectively.
Figure 15B:
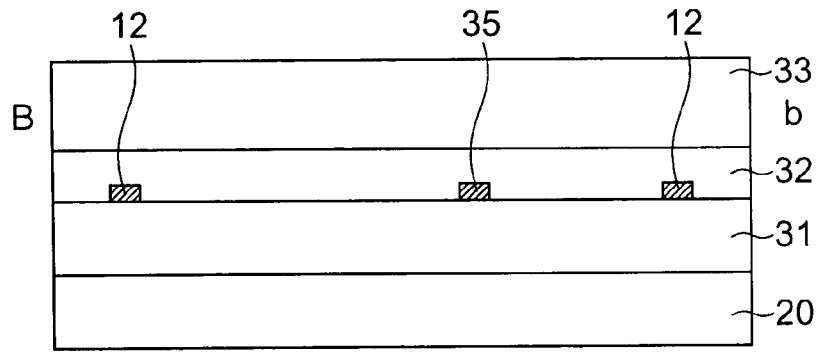
Figure 15C:
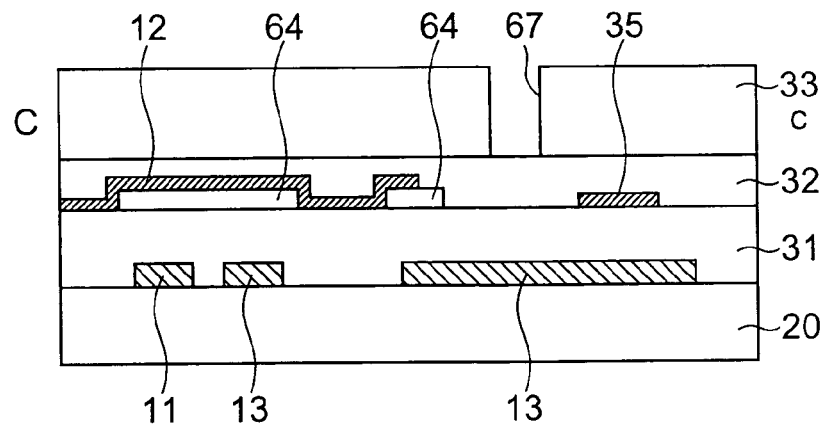
Figure 16:
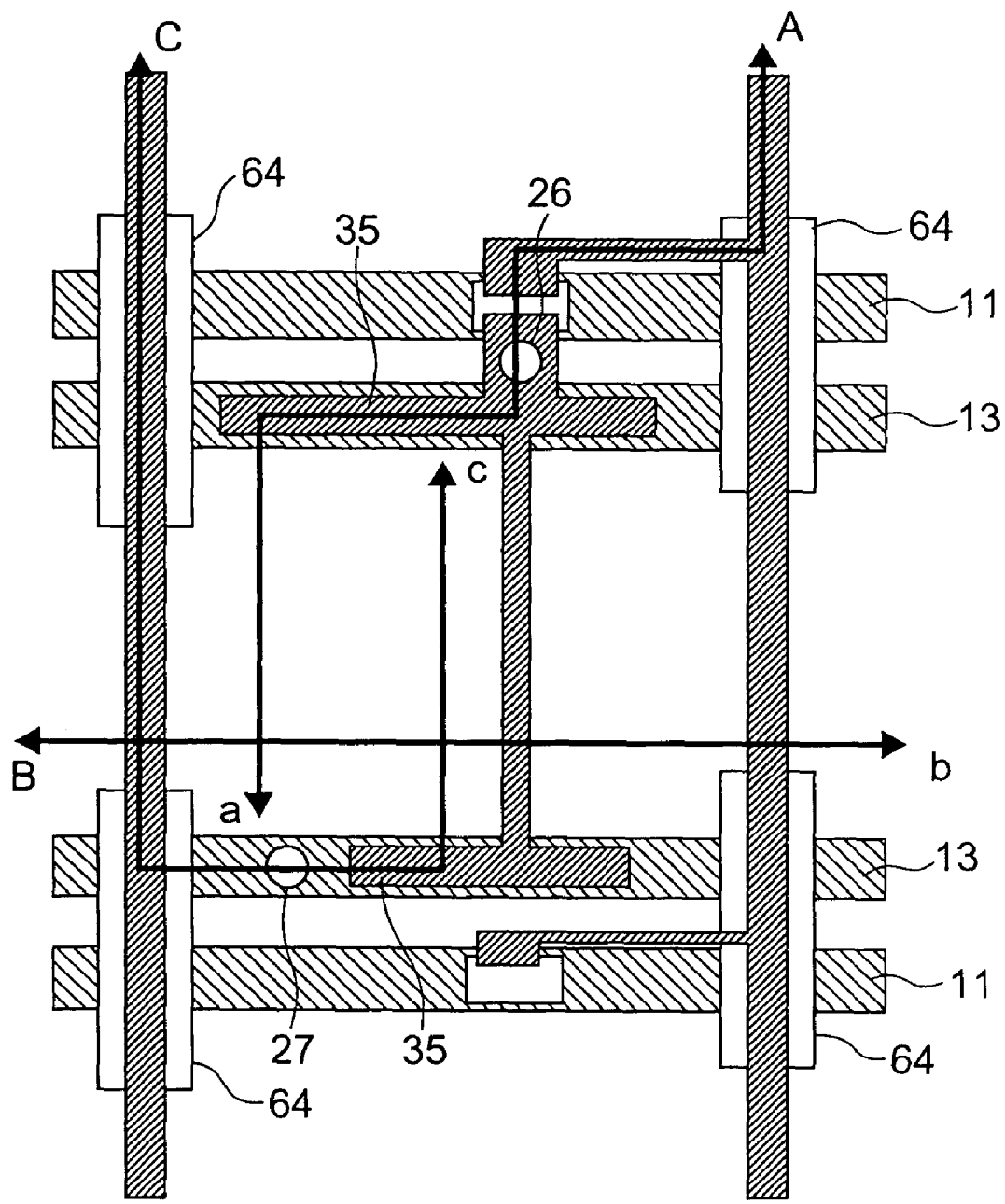
FIG. 16 is a process plan view (fifth process) of the one-pixel portion for explaining the example of the manufacturing method of the liquid crystal panel using the TFT substrate of FIG. 4.
Figure 17A:
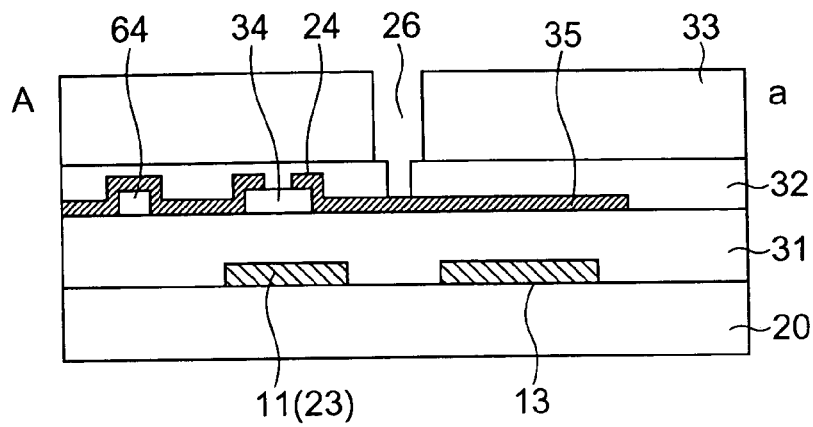
FIGS. 17A, 17B, and 17C are process sectional views taken along line A-a, line B-b, and line C-c in FIG. 16, respectively.
Figure 17B:
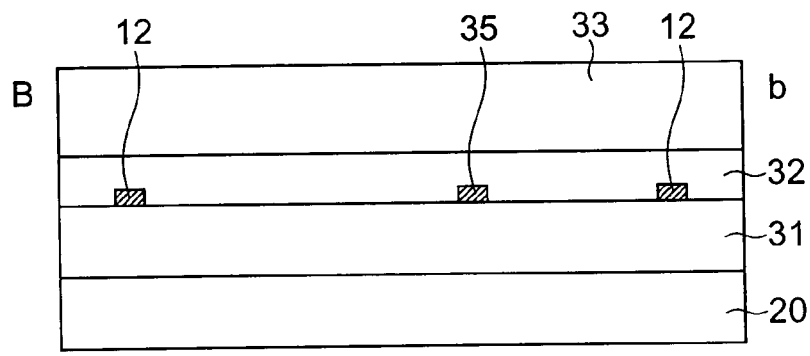
Figure 17C:
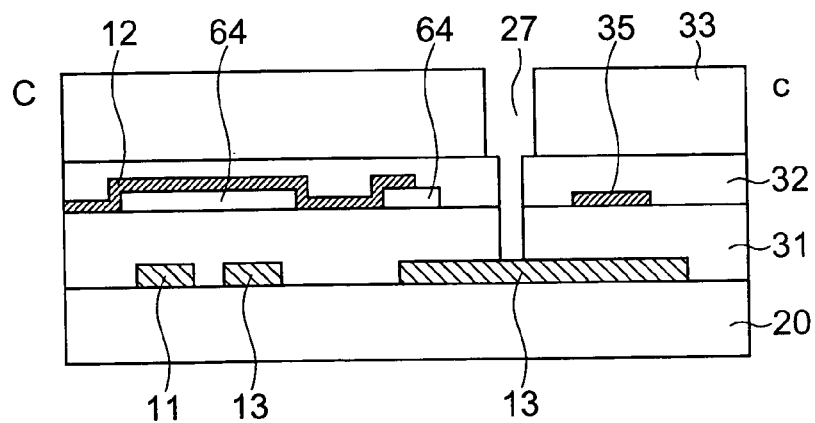

As shown in FIG. 7, the contact holes 27 are not provided for all the pixels, but decimated to be located in zigzags. Here, the contact holes 27 are decimated to a quarter relative to the number of pixels. Incidentally, the pixel electrode contact holes 26 are, of course, provided for all the pixels.

Now, a manufacturing method of the TFT substrate according to the first embodiment will be described with reference to FIGS. 8, 10, 12, 14, 16, and 5. Herein, each sectional view taken along line A-a shows a TFT portion, a pixel electrode contact hole portion, and an accumulation capacitor portion, each sectional view taken along line B-b shows a pixel portion, and each sectional view taken along line C-c shows a signal line portion, a common electrode contact hole portion, and the accumulation capacitor portion.

First, as shown in FIGS. 8 and 9A to 9C, on a transparent insulating substrate 20 such as a glass substrate, a conductive layer comprising a Cr film, an Mo film, a Cr/Al stacked film, an Mo/Al stacked film and having a thickness of about 100 to 300 nm is deposited by sputtering, and then scan lines 11 serving also as gate electrodes 23, common lines 13, scan line terminal portions (not shown), and common wiring terminal portions (not shown) are formed by photolithography.

Then, as shown in FIGS. 10 and 11A to 11C, by the use of plasma CVD, a gate insulating film 31 made of silicon nitride and having a thickness of about 300 to 500 nm, an amorphous silicon (a-Si) film having a thickness of about 150 to 300 nm, and a phosphorus-doped amorphous silicon (n+ type a-Si) film having a thickness of about 30 to 50 nm are sequentially formed, and then semiconductor layers 34 serving as active layers of the TFTs 14 are formed by photolithography. Semiconductor layers 64, which serve to improve voltage resistance, are formed at crossings of signal lines with the scan lines 11 and the common lines 13 in order to enhance the withstand voltage of them.

Then, as shown in FIGS. 12 and 13A to 13C, a conductive layer comprising a Cr film, an Mo film, a Cr/Al/Cr stacked film, an Mo/Al/Mo stacked film and having a thickness of about 100 to 400 nm is deposited by sputtering, and then source electrodes 24, drain electrodes 25, accumulation capacitor electrodes 35, signal lines 12, and signal line terminal portions (not shown) are respectively formed by photolithography. Subsequently, using the source electrodes 24 and the drain electrodes 25 as masks, the n+ type a-Si layers, i.e. the upper layers of the semiconductor layers 34 is removed by etching to thereby form channels.

Thereafter, a passivation film 32 made of an inorganic film such as a silicon nitride film and having a thickness of about 100 to 300 nm is deposited by plasma CVD.

Then, as shown in FIGS. 14 and 15A to 15C, using a positive photosensitive novolak resist, an organic insulating film having a thickness of about 1.5 to 3.5 µm is deposited, and openings 66 and 67 are formed at contact hole forming portions.

Thereafter, as shown in FIGS. 16 and 17A to 17C, the passivation film 32 is etched by photolithography to form pixel electrode contact holes 26 for exposing the source electrodes 24 and contact holes (not shown) for exposing the signal line terminal portions, at portions corresponding to the openings 66 and 67. Simultaneously, the passivation film 32 and the gate insulating film 31 are etched to thereby form common electrode contact holes 27 for exposing the common lines 13, contact holes (not shown) for exposing the scan line terminal portions and the common wiring terminal portions, and common-line connecting line contact holes (not shown) for exposing end portions of the respective common lines 13.

Then, as shown in FIGS. 5 and 6A to 6C, a transparent conductive film made of ITO or the like is deposited on the organic insulating film 33 by sputtering, and pixel electrodes 21, a common electrode 22, connection electrodes (not shown) on the scan line terminal portions, the signal line terminal portions, and the common wiring terminal portions, and common-line connecting lines (not shown) are formed by photolithography. In this event, as shown in FIG. 6B, with respect to the one-pixel portion, one tooth 72 of the common electrode 22 is located on the organic insulating film 33 correspondingly to the signal line 12, while one tooth 71 of the pixel electrode 21 is located on the organic insulating film 33 correspondingly to the accumulation capacitor electrode 35. Thereby, the pixel electrodes 21 connected to the source electrodes 24 via the pixel electrode contact holes 26, the common electrode 22 connected to the common lines 13 via the common electrode contact holes 27, the connection electrodes connected to the scan line terminal portions, the signal line terminal portions, and the common wiring terminal portions via the contact holes for the scan line terminal portions, the signal line terminal portions, and the common wiring terminal portions, and the common-line connecting lines connected to the end portions of the common lines 13 via the contact holes for the common-line connecting lines, are respectively formed.

Figure 18:
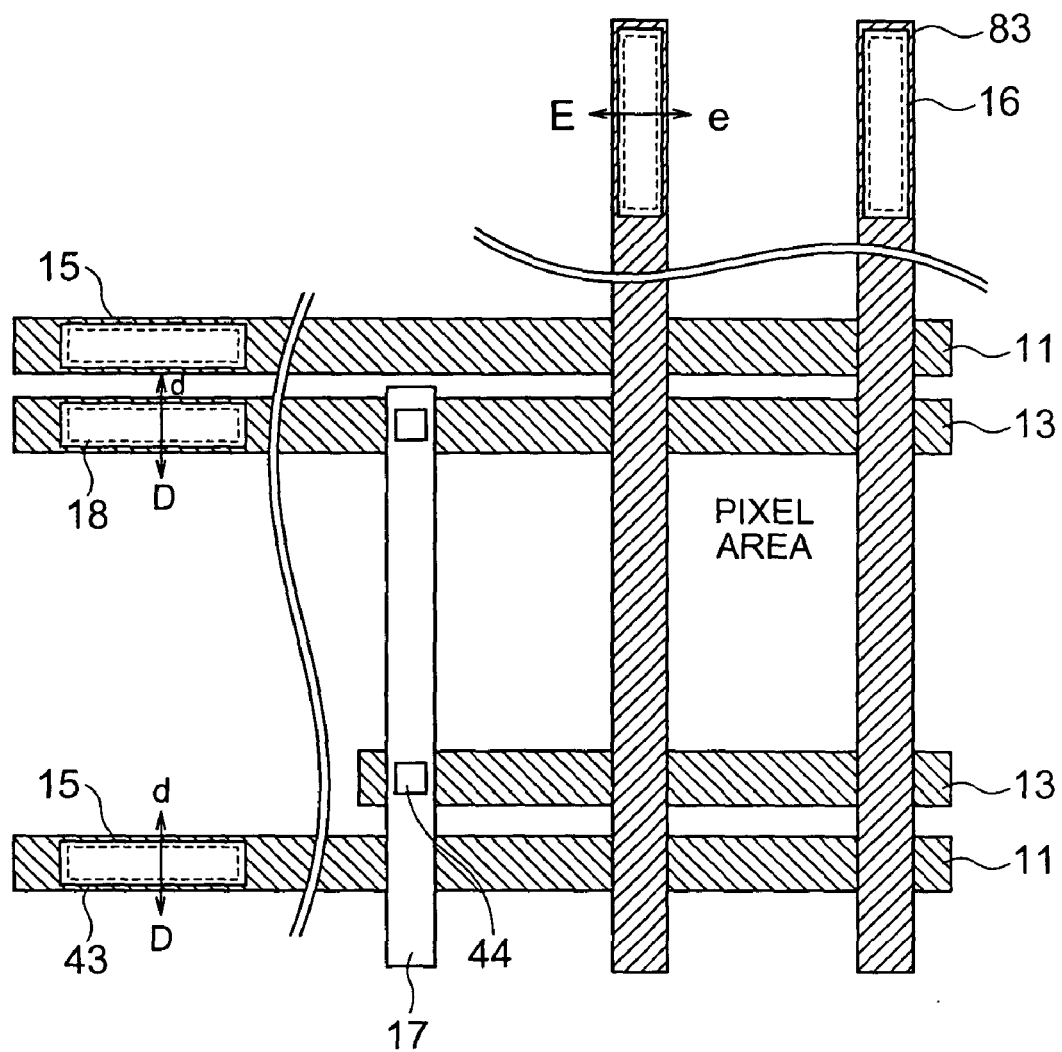
FIG. 18 is a plan view showing terminal portions on the periphery of the TFT substrate shown in FIG. 4.
Figure 19:
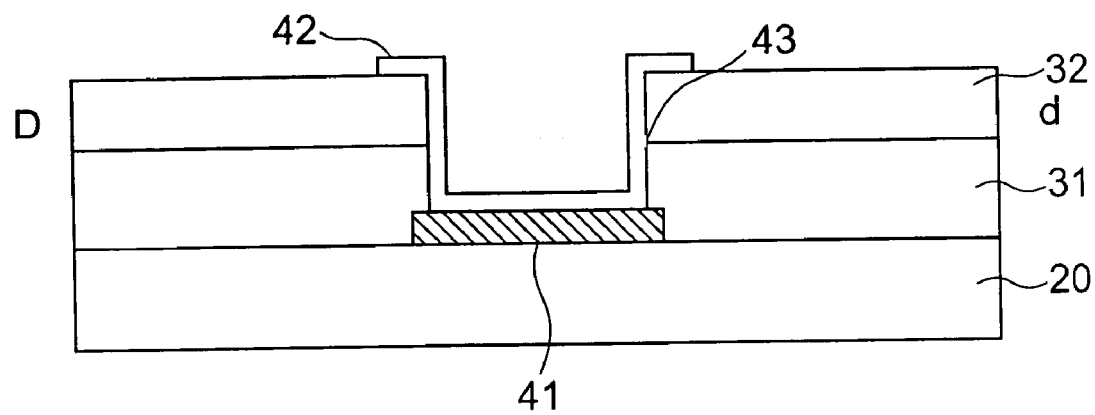
FIG. 19 is a sectional view taken along line D-d in FIG. 18.
Figure 20:
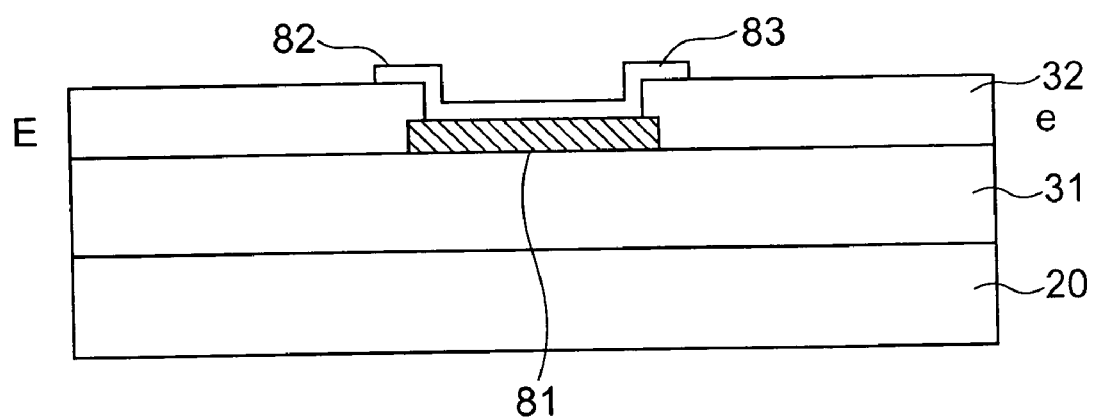
FIG. 20 is a sectional view taken along line E-e in FIG. 18.

Now, structures of the terminal portions of the TFT substrate of the first embodiment will be described. FIG. 18 is a plan view of the terminal portions on the periphery of the substrate, FIG. 19 is a sectional view taken along line D-d in FIG. 18 and showing a scan line terminal or a common line terminal, and FIG. 20 is a sectional view taken along line E-e in FIG. 18 and showing a signal line terminal. Each of the scan line terminal and the common line terminal is configured that a connection electrode 42 made of the same transparent conductive film as the common electrode is formed on a terminal portion metal film 41 made of the same metal film as the scan line, and connected via the gate insulating film 31, the passivation film 32, and a terminal portion contact hole 43. Similarly, the signal line terminal is configured that a connection electrode 82 made of the same transparent conductive film as the common electrode is formed on a terminal portion metal film 81 made of the same metal film as the signal line, and connected is via the gate insulating film 31, the passivation film 32, and a terminal portion contact hole 83. Accordingly, the organic insulating film is not formed at each terminal portion.

The respective common lines 13 are connected to the common-line connecting lines 17 via contact holes 44 for the common-line connecting lines. A sectional structure of the contact hole 44 is not shown, but is the same as that shown in FIG. 19.

Figure 21:
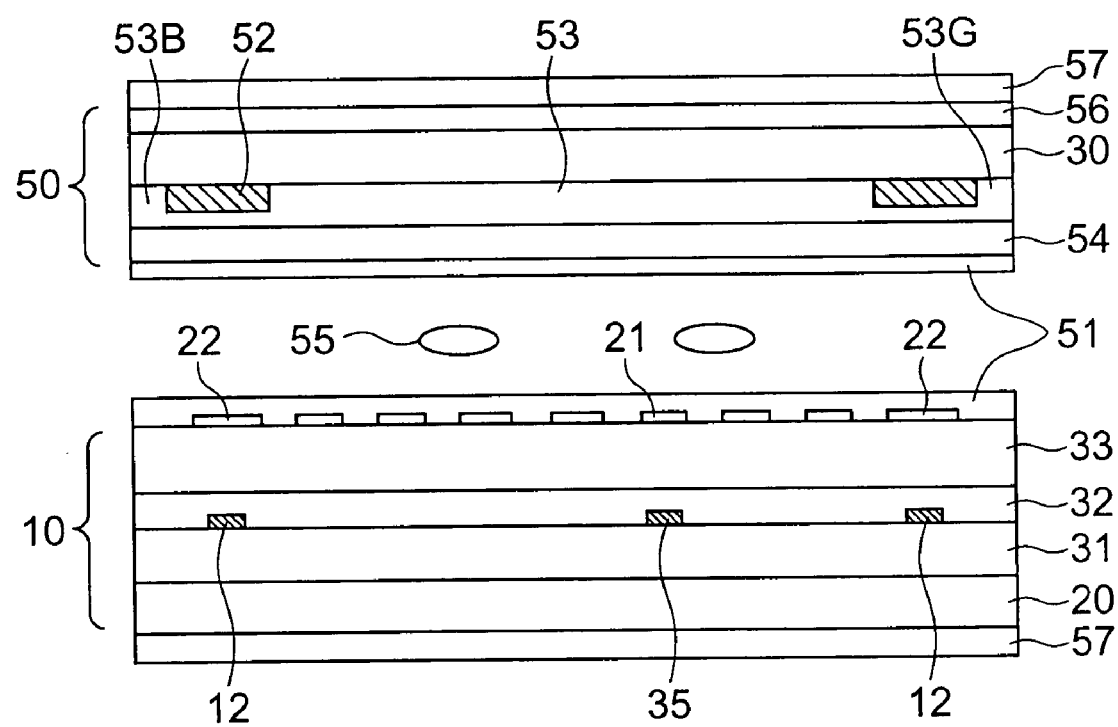
FIG. 21 is a sectional view showing a one-pixel portion of a liquid crystal panel using the TFT substrate of FIG. 4.

Now, description will be briefly given about a manufacturing method of a liquid crystal panel retaining liquid crystals between the TFT substrate of the first embodiment and an opposing substrate with reference to FIG. 21. An orientation film 51 made of a polyimide orientation agent and having a thickness of 30 to 60 nm is formed on the TFT substrate 10 and, after carrying out orientation processing, a sealant (not shown) made of an epoxy resin bonding agent is formed along the periphery of the TFT substrate 10.

On the other hand, on a transparent insulating substrate 30 such as a glass substrate that is formed with a transparent conductive layer 56 made of ITO or the like and having a thickness of about 80 to 150 nm on a surface opposite to a surface where color filters are formed, black matrixes each having a thickness of about 1 to 3 μm, an optical density (OD value) of three or greater, and a sheet resistance value of $1 \times 10^{16}$ Ω/square or greater are formed using a negative photosensitive acrylic pigment dispersion resist or a carbon resist. Then, using a negative photosensitive acrylic pigment dispersion resist, a red color filter 53R having a thickness of about 1.0 to 1.5 μm is formed. Likewise, color layers of a blue color filter 53B and a green color filter 53G are formed. Then, using a novolak resist, an overcoat film 54 made of an organic insulating film and having a thickness of about 2.0 to 3.5 μm is formed. Further, an orientation film 51 made of a polyimide orientation agent and having a thickness of 30 to 60 nm is formed thereon, and then orientation processing is performed to thereby obtain an opposing substrate 50.

Thereafter, the opposing substrate 50 is placed on the TFT substrate 10 via the sealant and an in-plane spacer (not shown). Subsequently, liquid crystals 55 made of a fluorine compound are injected into a space between both substrates from an injection hole (not shown), and then the injection hole is sealed with a sealing material (not shown) made of UV setting acrylate resin, thereby obtaining a panel with a predetermined gap.

Finally, polarizing plates 57 each formed by an iodine polarizing film are bonded to a surface of the TFT substrate 10 opposite to the element surface thereof and to a surface of the opposing substrate 50 opposite to the color filters, respectively. In this manner, a liquid crystal panel using the foregoing TFT substrate 10 and achieving a wide viewing angle and a high aperture ratio is manufactured.

As described above, in the IPS liquid crystal display in which the signal lines are partially covered with the common electrode via the interlayer insulating film, the contact holes connecting the common wiring and the common electrode to each other are not formed per pixel, but formed through decimation. Therefore, even if patterning failure occurs due to foreign matter or the like in the signal line forming process, the probability of occurrence of short-circuiting between the signal lines and the common electrode via those contact holes can be lowered to thereby enable improvement in manufacturing yield. This effect is remarkable particularly for a QSXGA-level large-size high-resolution panel with a small pixel area. Further, since the contact holes are arranged in zigzags, uniformity of display can be ensured.

(Second Embodiment)

In the second embodiment of the present invention, an interlayer insulating film on TFTs is formed only by an inorganic film. The structure of a TFT substrate is the same as that in the first embodiment shown in FIG. 4.

Figure 22:
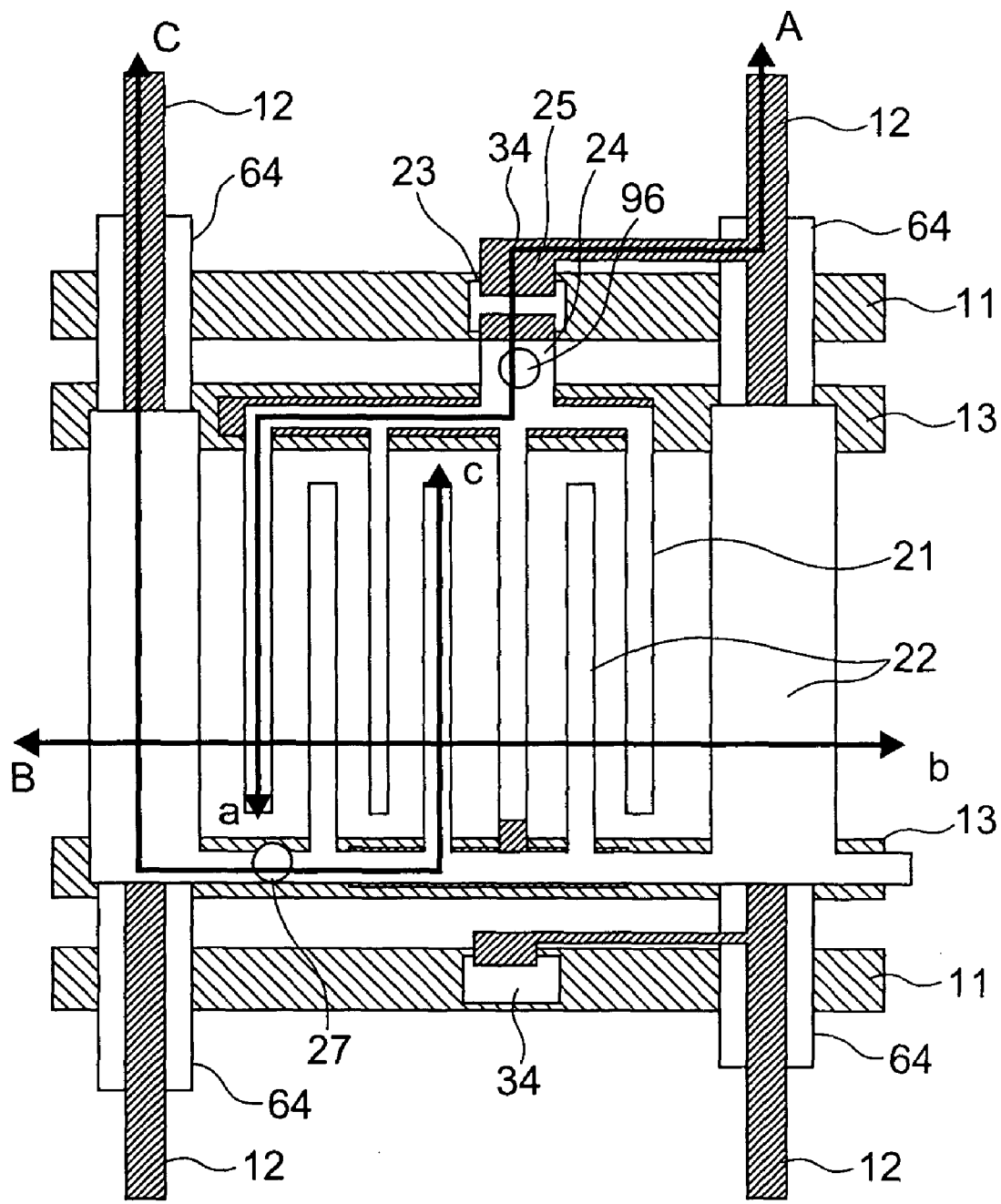
FIG. 22 is an enlarged plan view showing a one-pixel portion of a TFT substrate in an IPS liquid crystal display according to a second embodiment of the present invention.
Figure 23A:
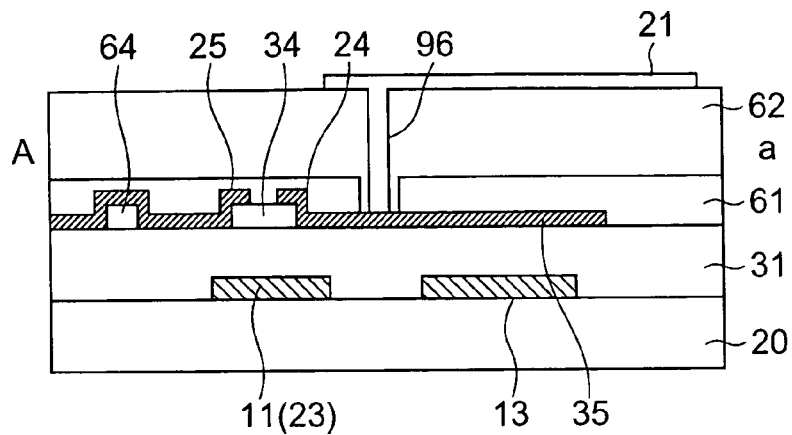
FIGS. 23A, 23B, and 23C are sectional views taken along line A-a, line B-b, and line C-c in FIG. 22, respectively.
Figure 23B:
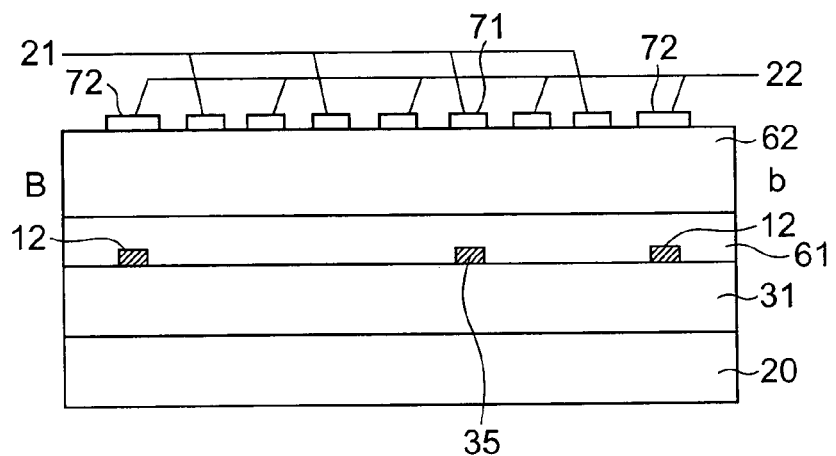
Figure 23C:
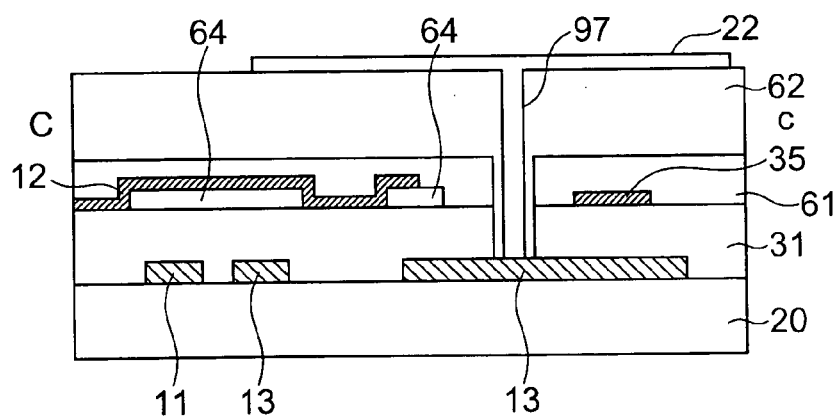
Figure 24:
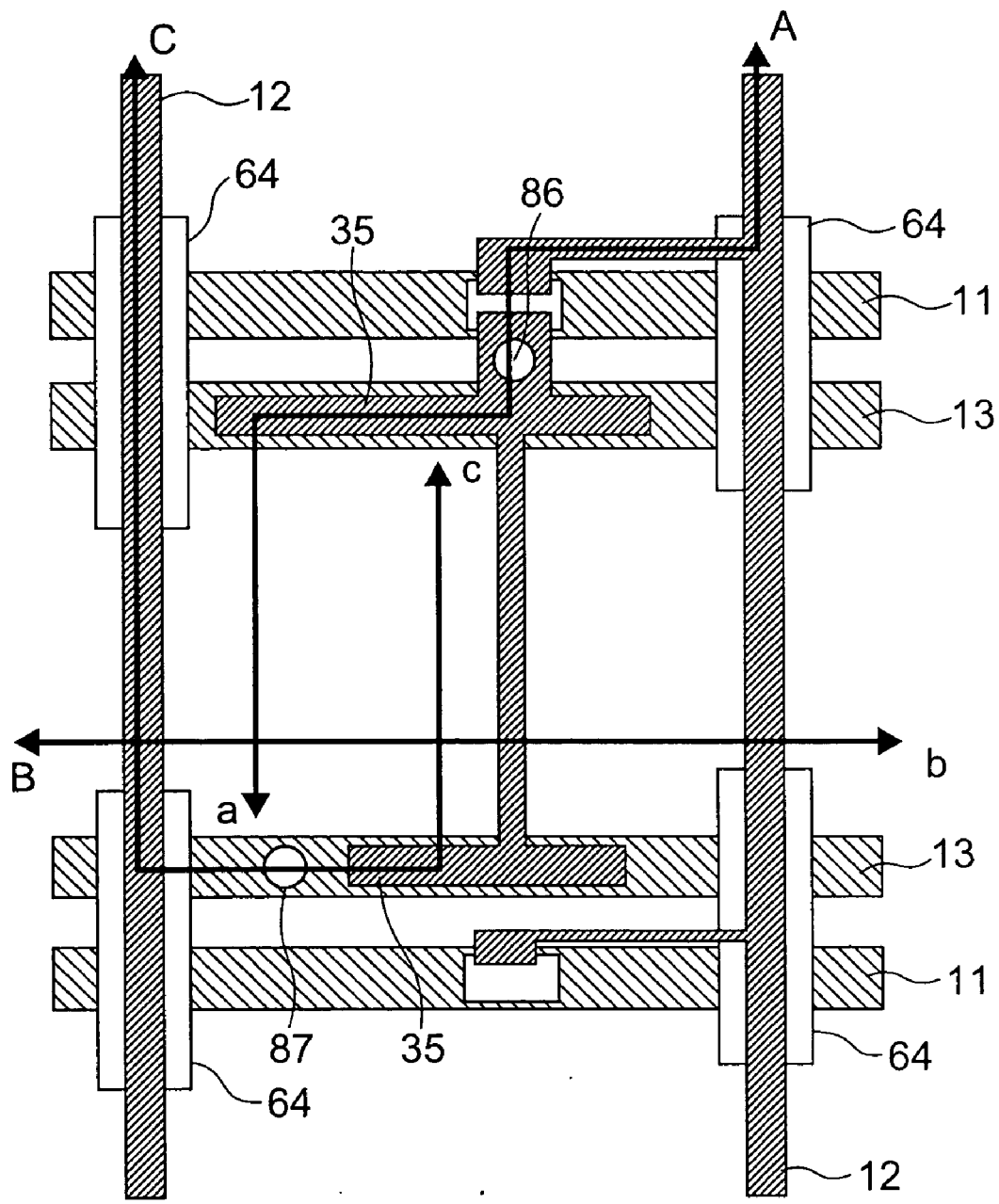
FIG. 24 is a process plan view (fourth process) of the one-pixel portion of the TFT substrate according to the second embodiment of the present invention.
Figure 25A:
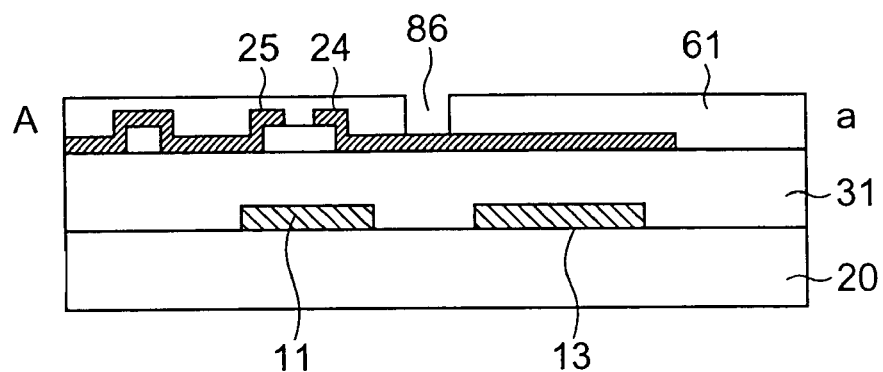
FIGS. 25A, 25B, and 25C are process sectional views taken along line A-a, line B-b, and line C-c in FIG. 24, respectively.
Figure 25B:
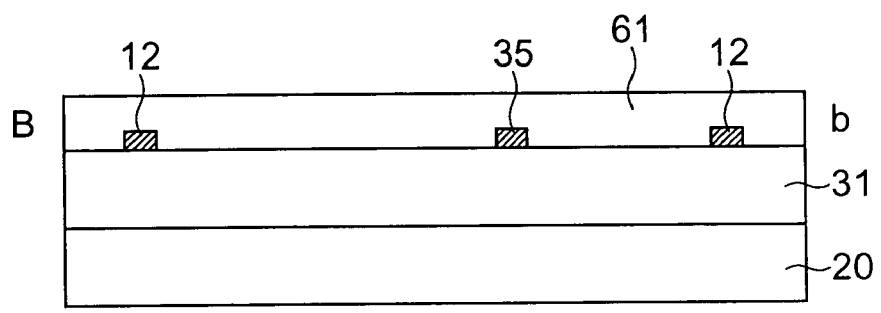
Figure 25C:
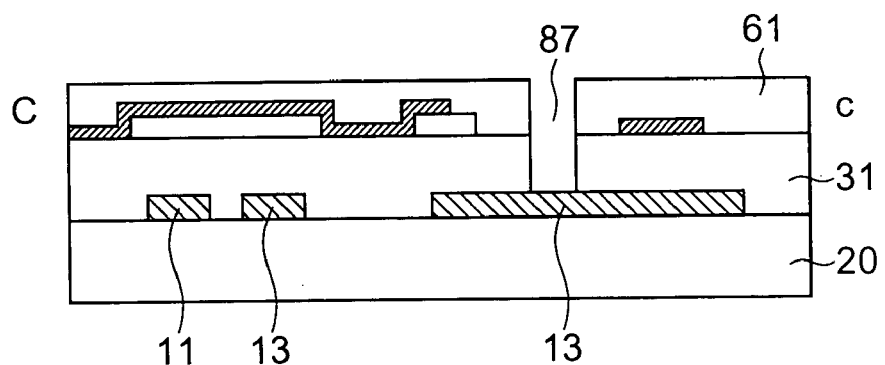
Figure 26:
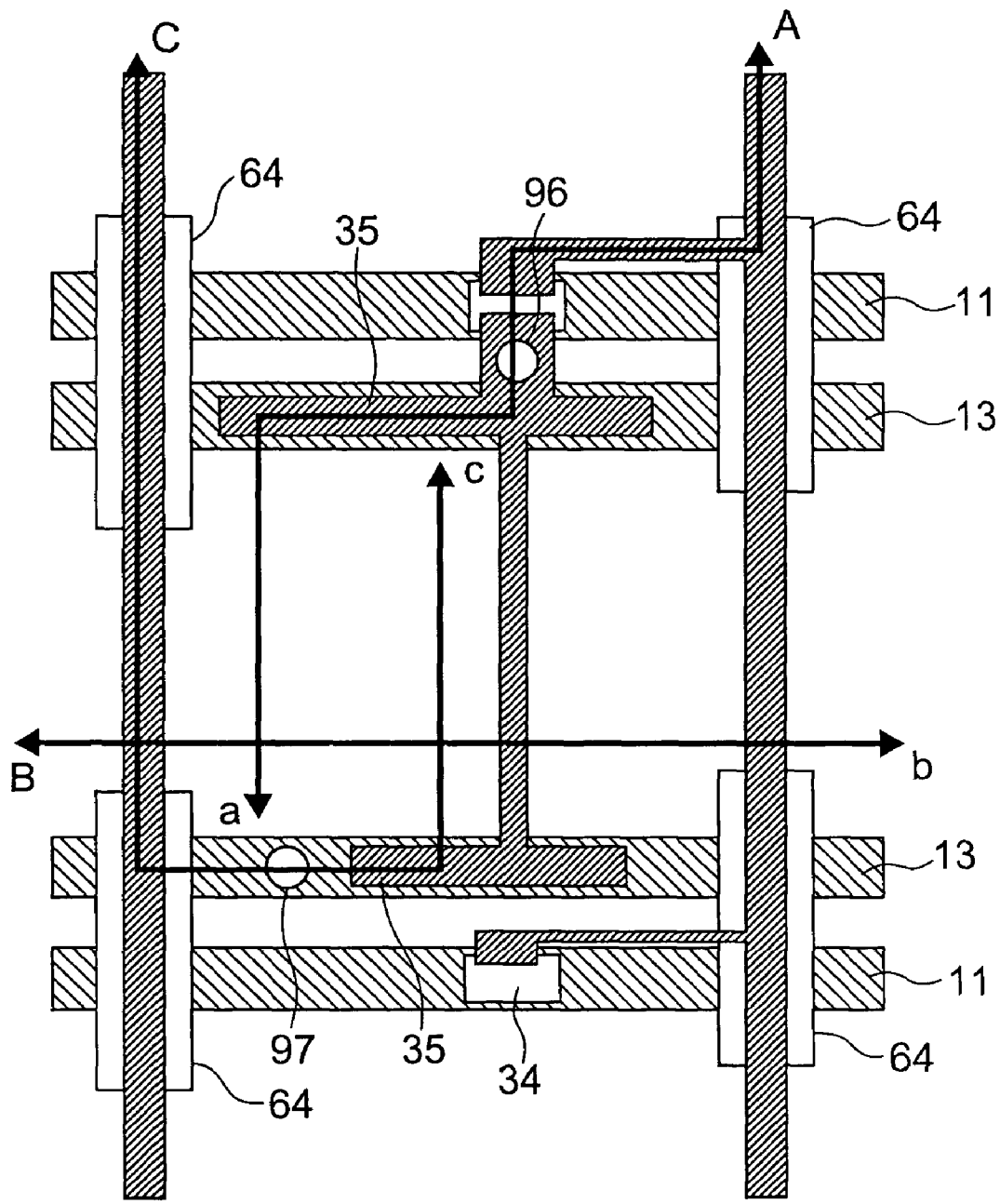
FIG. 26 is a process plan view (fifth process) of the one-pixel portion of the TFT substrate according to the second embodiment of the present invention.
Figure 27A:
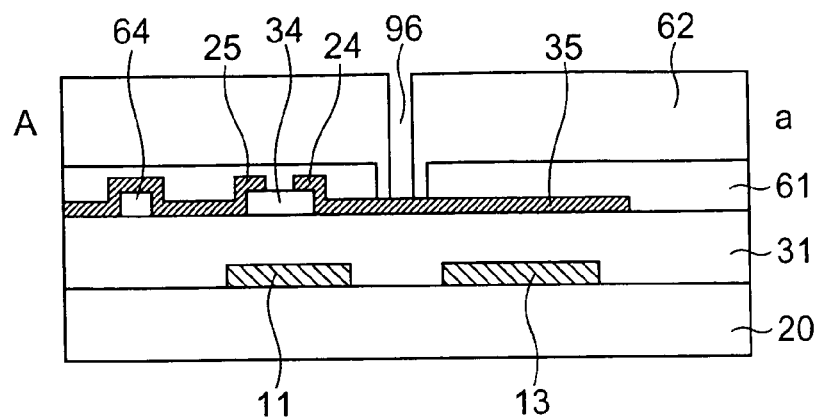
FIGS. 27A, 27B, and 27C are process sectional views taken along line A-a, line B-b, and line C-c in FIG. 26, respectively.
Figure 27B:
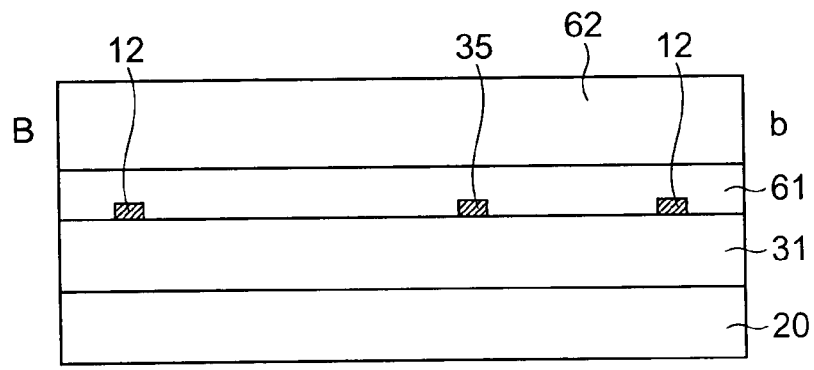
Figure 27C:
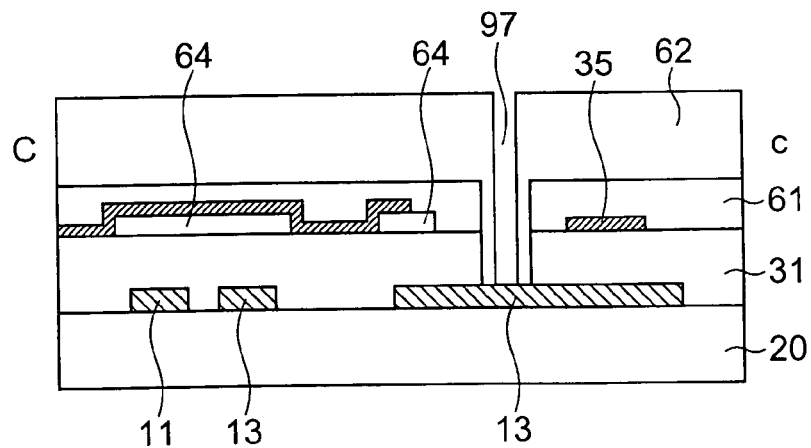

As shown in FIG. 22, in a region defined by crossing between scan lines 11 and signal lines 12 formed on the TFT substrate, a pixel electrode 21 and a common electrode 22 each formed like a comb having teeth are arranged with their teeth located alternately, and electric fields substantially parallel to the TFT substrate 10 are generated between the electrodes to thereby control orientation of liquid crystal molecules. As shown in FIGS. 23A to 23C, the pixel electrode 21 and the common electrode 22 are provided on an interlayer insulating film comprising two layers of passivation films 61 and 62 that are formed on a TFT 14.

Like in the first embodiment, the TFT 14 is an inverse stagger thin film transistor also in this embodiment. Herein, a gate electrode 23 of the TFT 14 is formed as a part of the scan line 11, a source electrode 24 is connected to the pixel electrode 21 via a pixel electrode contact hole 26 formed in the interlayer insulating film, the common line 13 is connected to the common electrode 22 via a common electrode contact hole 27 formed in the interlayer insulating film and a gate insulating film 31, and a drain electrode 25 is connected to the signal line 12. In this embodiment, the common electrode contact holes 27 are provided for all the pixels.

Now, a manufacturing method of the TFT substrate according to the second embodiment will be described. Since the process of forming the TFT 14 is the same as that in the first embodiment (FIGS. 8 to 13C), description thereof is omitted.

As shown in FIGS. 24 and 25A to 25C, a first passivation film 61 made of an inorganic film such as a silicon nitride film and having a thickness of about 300 to 500 nm is deposited by plasma CVD, and then the first passivation film 61 is etched by photolithography to form pixel electrode openings 86 for exposing source electrodes 24 and contact holes (not shown) for exposing signal line terminal portions. Simultaneously, the first passivation film 61 and a gate insulating film 31 are etched to thereby form common electrode openings 87 for exposing common lines 13, contact holes (not shown) for exposing scan line terminal portions and common wiring terminal portions, and common-line connecting line contact holes (not shown) for exposing end portions of the common lines 13. The etching for the contact holes in this event is dry etching or a combination of wet etching and dry etching, and includes at least the dry etching.

Then, as shown in FIGS. 26 and 27A to 27C, a second passivation film 62 made of an inorganic film such as a silicon nitride film and having a thickness of about 300 to 500 nm is deposited by plasma CVD, then by photolithography and using the same mask as in the foregoing process, the second passivation film 62 is etched to thereby form pixel electrode contact holes 96 for exposing the source electrodes 24 and contact holes (not shown) for exposing the signal line terminal portions, and the first passivation film 61 and the gate insulating film 31 are etched to thereby form common electrode contact holes 97 for exposing the common lines 13, contact holes (not shown) for exposing the scan line terminal portions and the common wiring terminal portions, and common-line connecting line contact holes (not shown) for exposing the end portions of the common lines 13. In this event, an exposure amount is adjusted so as to provide openings inside the contact holes in the foregoing process, respectively. The etching for the contact holes in this event may be wet etching, dry etching, or a combination thereof.

Then, as shown in FIGS. 22 and 23A to 23C, like in the first embodiment, a transparent conductive film made of ITO or the like is deposited on the first and second passivation films 61 and 62 by sputtering, and pixel electrodes 21, a common electrode 22, connection electrodes (not shown) on the scan line terminal portions, the signal line terminal portions, and the common wiring terminal portions, and common-line connecting lines (not shown) are formed by photolithography. In this event, with respect to the one-pixel portion, one tooth 72 of the common electrode 22 is located on the first and second passivation films 61 and 62 correspondingly to the signal line 12, while one tooth 71 of the pixel electrode 21 is located on the first and second passivation films 61 and 62 correspondingly to the accumulation capacitor electrode 35. Thereby, the pixel electrodes 21 connected to the source electrodes 24 via the pixel electrode contact holes 96, the common electrode 22 connected to the common lines 13 via the common electrode contact holes 97, the connection electrodes connected to the scan line terminal portions, the signal line terminal portions, and the common wiring terminal portions via the contact holes for the scan line terminal portions, the signal line terminal portions, and the common wiring terminal portions, and the common-line connecting lines connected to the end portions of the common lines 13 via the contact holes for the common-line connecting lines, are respectively formed. Herein, the structures of the respective terminal portions are the same as those in the first embodiment (FIGS. 19 and 20) except that there are provided the two-layer passivation films.

A subsequent cell process is carried out in the same manner as in the first embodiment so that a liquid crystal panel using the TFT substrate of this embodiment is manufactured.

According to experiments by the present inventors, when there was only a single-layer passivation film and the contact hole forming process was performed only once, short-circuiting between the signal lines and the common electrode occurred frequently. This was found out to be caused by the fact that pinholes were formed in the interlayer insulating film due to dry etching upon forming the contact holes. The pinholes are presumed to be generated by the fact that plasma is concentrated on foreign matter or defect portions of a photoresist in the contact hole forming process. By dividing the passivation film into two layers and implementing the contact hole forming is process twice, although pinholes are generated in the first passivation film 61, even if pinholes are generated in the second passivation film 62, the probability of occurrence of the pinholes at the same portions is extremely low. That is, when dry etching is used upon forming the contact holes in the second passivation film 62, pinholes are generated likewise, but a time for etching the second passivation film 62 is naturally shorter than a time for etching the total thickness of the first passivation film 61 and the second passivation film 62. Therefore, pinholes are not formed through the total thickness of the passivation films. Of course, when the second passivation film 62 is wet etched, pinholes are not generated in the second passivation film 62, and therefore, pinholes are formed only in a thickness of the first passivation film. Accordingly, by employing the manufacturing method of this embodiment with respect to the IPS liquid crystal display in which the signal lines are partially covered with the common electrode via the interlayer insulating film, it is possible to significantly reduce possibility of occurrence of short-circuiting between the signal lines and the common electrode.

Further, in this embodiment, since the formation of the openings in the first passivation film 61 and the second passivation film 62 is implemented using the same mask, although the number of times of the photolithography process is increased by one, there is a merit that the number of masks is not increased. Furthermore, since the openings of the second passivation film 62 are provided inside the openings of the first passivation film 61, respectively, even if the openings of the second passivation film 62 are formed by wet etching, the shapes of the contact holes can be kept excellent. In other words, if the openings of the second passivation film 62 are provided outside the openings of the first passivation film 61, particularly when the gate insulating film is formed by a film such as a silicon oxide film that is different from the silicon nitride film, side etching is caused in the silicon oxide film. As a consequence, the shapes of the contact holes can not be kept in stepped shapes to thereby cause gaps in the transparent conductive film formed thereon. By providing the openings of the second passivation film 62 inside the openings of the first passivation film 61, respectively, such failure can be prevented because side walls of the openings of the first passivation film 61 are protected by the second passivation film 62.

(Third Embodiment)

The third embodiment of the present invention, like the second embodiment, relates to a case wherein an interlayer insulating film on TFTs is formed only by an inorganic film. This embodiment only differs from the second embodiment in that the inorganic film of the interlayer insulating film is formed by a single layer, and the other structure thereof is the same as that of the second embodiment.

Figure 28A:
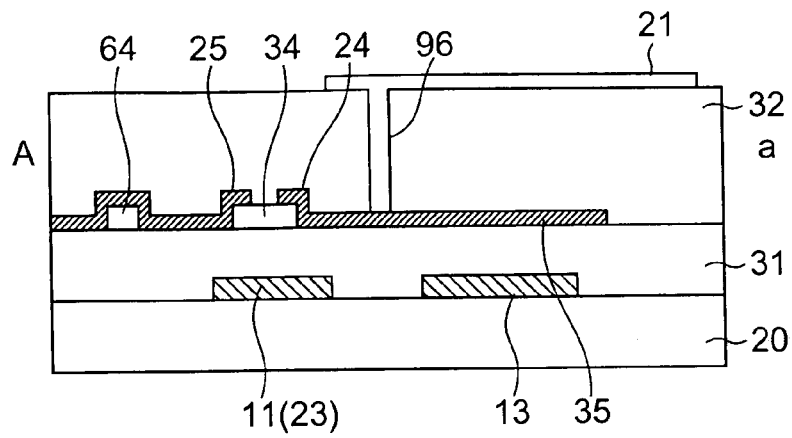
FIGS. 28A, 28B, and 28C are sectional views respectively taken along line A-a, line B-b, and line C-c in an enlarged plan view (same as FIG. 22) showing a one-pixel portion of a TFT substrate in an IPS liquid crystal display according to a third embodiment of the present invention.
Figure 28B:
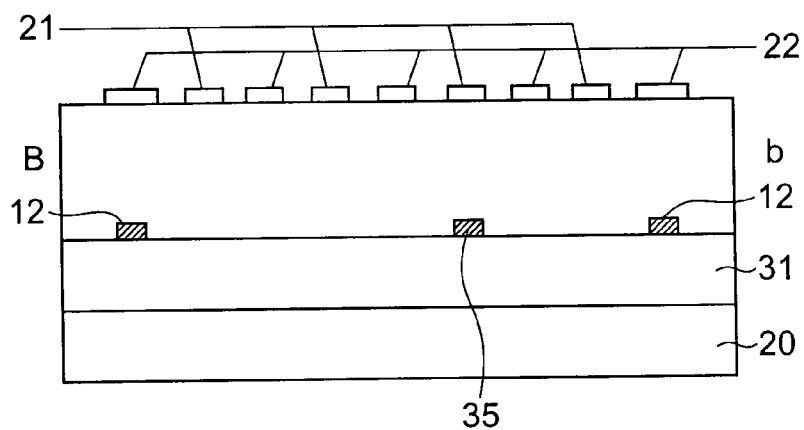
Figure 28C:
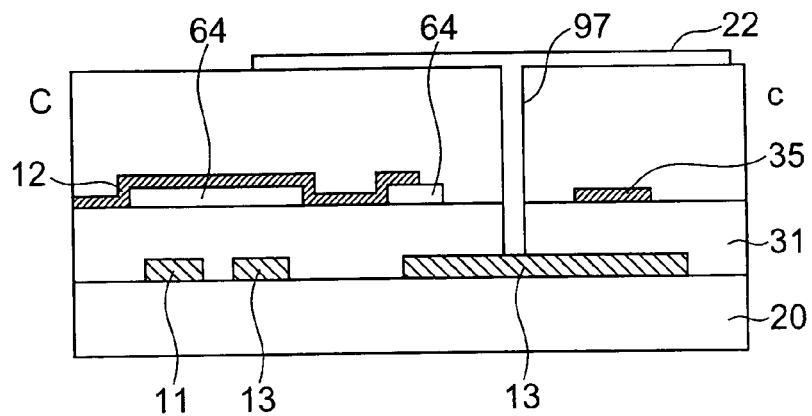

As shown in FIGS. 28A, 28B, and 28C, a pixel electrode 21 and a common electrode 22 are provided on an interlayer insulating film made of a single-layer passivation film 32 that is formed on a TFT 14.

Now, a manufacturing method of the TFT substrate according to the third embodiment will be described. What differs from the second embodiment only resides in passivation film forming and contact hole forming processes. Specifically, a passivation film 32 made of an inorganic film such as a silicon nitride film and having a thickness of about 700 to 1000 nm is deposited by plasma CVD. Then, by photolithography, the passivation film 32 is etched to thereby form pixel electrode contact holes 96 for exposing source electrodes 24 and contact holes (not shown) for exposing signal line terminal portions, and the passivation film 32 and a gate insulating film 31 are etched to thereby form common electrode contact holes 97 for exposing common lines 13, contact holes (not shown) for exposing scan line terminal portions and common wiring terminal portions, and common-line connecting line contact holes (not shown) for exposing end portions of the common lines 13. In this event, the etching for the contact holes is a combination of wet etching and dry etching, and is characterized in that the thickness of the passivation film 32 is greater than a thickness that is dry etched (to be exact, a thickness corresponding to a time of dry etching).

As described above, by forming the passivation film to be thicker than the thickness corresponding to the time of dry etching upon forming the contact holes, even if pinholes are formed in the passivation film, the pinholes do not go through the whole thickness thereof for the foregoing reason. Therefore, it is possible to remarkably reduce possibility of occurrence of short-circuiting between the signal lines and the common electrode.

The first embodiment shows the example in which the organic insulating film such as the photosensitive novolak resist is used. However, instead thereof, polyimide resin or acrylic resin may be used, or an inorganic resin material such as silicon oxide or silicon nitride may be used. Further, it is not necessarily photosensitive, but may also be non-photo-sensitive. In this case, like in the normal photolithography process, an etching process and a resist removing process are required after development. Further, the example is shown wherein the process of forming the organic insulating film and the process of forming the openings in the passivation film are implemented by the separate photolithography processes, but may be carried out by the same photolithography process.

In the foregoing embodiments, the description has been given about the liquid crystal display having the inverse stagger channel H TFT. However, it may also be a channel protection TFT or a stagger TFT. Further, it is readily understood that not only the staggered TFT, but also a coplanar TFT can be used therefor. Moreover, it may be applicable to not only the a-Si TFT, but also a polysilicon (p-Si) TFT. Further, a switching element may also be an MIM device.

As described above, according to the present invention, in the IPS liquid crystal display in which the signal lines are partially covered with the common electrode via the interlayer insulating film, it is possible to remarkably reduce possibility of occurrence of short-circuiting between the signal lines and the common electrode to thereby improve the manufacturing yield without deteriorating the display performance.

What is claimed is:

1. A method of manufacturing an in-plane switching liquid crystal display having thin film transistors on a substrate, scan lines and signal lines connected to the thin film transistors and longitudinally and latitudinally crossing each other, and common wiring formed by the same layer as the scan lines and generating electric fields substantially parallel to the substrate between a common electrode connected to the common wiring and covering the signal lines partially via an interlayer insulating film formed on the thin film transistors, and pixel electrodes connected to the thin film transistors, the method comprising the steps of:

forming a first inorganic insulating film on at least source and drain electrodes of the thin film transistors, forming first contact holes in said first inorganic insulating film for connecting the common wiring and the common electrode to each other, and second contact holes in said first inorganic insulating film for connecting the thin film transistors and the pixel electrodes to each other using at least dry etching, forming a second inorganic insulating film on the first inorganic insulating film, forming third contact holes in said second inorganic insulating film so as to be superposed on the first contact holes, and fourth contact holes in said second inorganic insulating film so as to be superposed on the second contact holes, forming a conductive film on the second inorganic insulating film, forming the common electrode connected to the common wiring via the first and third contact holes, and forming the pixel electrodes connected to the thin film transistors via the second and fourth contact holes, wherein the third contact holes are formed inside the first contact holes while the fourth contact holes are formed inside said second contact holes.

* * * * *